United States Patent
Kawaguchi

(10) Patent No.: US 9,759,137 B2
(45) Date of Patent: Sep. 12, 2017

(54) CONTROLLER FOR VARIABLE VALVE MECHANISM

(71) Applicant: Yohei Kawaguchi, Toyota (JP)

(72) Inventor: Yohei Kawaguchi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 90 days.

(21) Appl. No.: 14/900,861

(22) PCT Filed: Jun. 26, 2013

(86) PCT No.: PCT/JP2013/067556
§ 371 (c)(1),
(2) Date: Dec. 22, 2015

(87) PCT Pub. No.: WO2014/207847
PCT Pub. Date: Dec. 31, 2014

(65) Prior Publication Data
US 2016/0146120 A1 May 26, 2016

(51) Int. Cl.
*F01L 1/34* (2006.01)
*F02D 13/02* (2006.01)
(Continued)

(52) U.S. Cl.
CPC .......... *F02D 13/023* (2013.01); *F01L 1/267* (2013.01); *F01L 13/0063* (2013.01);
(Continued)

(58) Field of Classification Search
CPC .... F02D 13/023; F02D 41/0047; F02D 13/06; F02D 41/008; F02D 41/0087;
(Continued)

(56) References Cited

U.S. PATENT DOCUMENTS 7,665,434 B2 * 2/2010 Conti .................. F01L 1/18
123/90.15

FOREIGN PATENT DOCUMENTS

JP 2006 322371 11/2006
JP 2007 16632 1/2007
(Continued)

OTHER PUBLICATIONS

International Search Report issued Jul. 30, 2013 in PCT/JP2013/067556 filed Jun. 26, 2013.

*Primary Examiner* — Zelalem Eshete
(74) *Attorney, Agent, or Firm* — Oblon, McClelland, Maier & Neustadt, L.L.P.

(57) ABSTRACT

An internal combustion engine is provided with a plurality of cylinders, air intake valves provided to each of the cylinders, and a variable valve actuation mechanism for varying the valve actuation of the air intake valves. A motor drives the variable valve actuation mechanism. A motor controller controls the motor. The internal combustion engine is capable of operating in a cylinder deactivation mode, in which the air intake valves of some of the cylinders are kept shut. When the internal combustion engine is reactivated from the cylinder deactivation mode, the motor controller executes an air intake amount correction process, in which the opening duration of the air intake valves is temporarily increased, thereby increasing the amount of air taken in by operating cylinder for which the air intake valves have been opened or closed even during the cylinder deactivation mode.

6 Claims, 14 Drawing Sheets

(51) Int. Cl.
*F02D 41/00* (2006.01)
*F02D 13/06* (2006.01)
*F01L 1/26* (2006.01)
*F01L 13/00* (2006.01)
*F02B 29/02* (2006.01)
*F01L 1/18* (2006.01)
*F01L 1/24* (2006.01)
*F02M 26/05* (2016.01)
*F02M 26/23* (2016.01)

(52) U.S. Cl.
CPC .............. *F02B 29/02* (2013.01); *F02D 13/06* (2013.01); *F02D 41/0002* (2013.01); *F02D 41/008* (2013.01); *F02D 41/0047* (2013.01); *F02D 41/0087* (2013.01); *F01L 1/185* (2013.01); *F01L 1/2405* (2013.01); *F01L 2105/00* (2013.01); *F01L 2820/032* (2013.01); *F02D 2041/001* (2013.01); *F02D 2041/0012* (2013.01); *F02D 2250/21* (2013.01); *F02M 26/05* (2016.02); *F02M 26/23* (2016.02); *Y02T 10/18* (2013.01); *Y02T 10/42* (2013.01)

(58) Field of Classification Search
CPC ...... F02D 41/0002; F02B 29/02; F01L 1/267; F01L 13/0063
See application file for complete search history.

(56) References Cited

FOREIGN PATENT DOCUMENTS

JP 2013 57289 3/2013
WO 2014 162517 10/2014

\* cited by examiner

CONTROLLER FOR VARIABLE VALVE MECHANISM

TECHNICAL FIELD

The present invention relates to a controller for a variable valve actuation mechanism.

BACKGROUND ART

Internal combustion engines that use cylinder deactivation during engine operation have been proposed. Cylinder deactivation shuts down some of the cylinders by stopping opening and closing operation of the intake valves to keep the valves closed for some of the cylinders.

When the internal combustion engine is reactivated from a cylinder deactivation mode to an all cylinder operation mode, torque fluctuation tends to occur due to change in the engine output.

For this reason, for example, the internal combustion engine disclosed in Patent Document 1 reduces the lift amount of the intake valves when the engine is reactivated from the cylinder deactivation mode to reduce the engine output. This configuration restrains the occurrence of torque fluctuation caused by increase in the engine output when the engine is reactivated from the cylinder deactivation mode to the all cylinder operation mode.

PRIOR ART DOCUMENTS

Patent Documents

Patent Document 1: Japanese Laid-Open Patent Publication No. 2006-322371

SUMMARY OF THE INVENTION

Problems that the Invention is to Solve

The apparatus disclosed in the above-mentioned Patent Document 1 reduces the lift amount of the intake valves to prevent increase in the engine output caused by increase in the number of operating cylinders due to reactivation from the cylinder deactivation mode. However, the torque fluctuation may occur due to other factors at reactivation from the cylinder deactivation mode.

That is, at reactivation from the cylinder deactivation mode, the intake valves of the deactivated cylinders, which have been kept closed, restart the opening and closing operation with valve actuation corresponding to the engine output requirement at the time of reactivation. At this time, if the opening duration of the intake valves of the cylinders partially overlap between the cylinders, that is, if overlap occurs in the opening duration of the intake valves between the cylinders, when part of the opening duration of the intake valves of the reactivated cylinders, in which the opening and closing operation of the intake valves is restarted, overlaps part of the opening duration of the intake valves of the operating cylinders, in which the intake valves have been opened and closed even during execution of the cylinder deactivation mode, some of the intake air that has been flowing into the operating cylinders also flows into the reactivated cylinders. Thus, the intake air that flows into the operating cylinders is reduced causing the output torque of the operating cylinders to be reduced. Although some of the intake air starts to flow into the reactivated cylinders, output torque is not generated from the reactivated cylinders until combustion of air-fuel mixture is started after reactivation from the cylinder deactivation mode. Thus, the output torque of the internal combustion engine may be reduced and cause torque fluctuation immediately after reactivation from the cylinder deactivation mode and until output torque is generated from the reactivated cylinders.

Accordingly, it is an objective of the present invention to provide a controller for a variable valve actuation mechanism that reliably prevents torque fluctuation that may occur due to overlap in the opening duration of the intake valves between the cylinders at reactivation from the cylinder deactivation mode.

Means for Solving the Problems

To achieve the foregoing objective and in accordance with one aspect of the present invention, a controller for a variable valve actuation mechanism applied to an internal combustion engine is provided. The engine includes a plurality of cylinders, a plurality of intake valves each provided in one of the cylinders, and a variable valve actuation mechanism, which changes valve actuation of the intake valves. The engine is operable in a cylinder deactivation mode, which keeps the intake valves of some of the cylinders closed. The controller includes a control section that controls the valve actuation in accordance with an engine output requirement. Even during execution of the cylinder deactivation mode, the intake valve of an operating one of the cylinders is opened and closed. The control section executes an intake amount correction process, which controls the valve actuation of the operating cylinder such that, when the internal combustion engine is reactivated from the cylinder deactivation mode, opening duration of the intake valve of the operating cylinder is temporarily increased as compared to the opening duration in a case in which the valve actuation of the operating cylinder is controlled in accordance with the engine output requirement during the cylinder deactivation mode.

With this configuration, the control section executes the intake amount correction process. When the intake amount correction process is executed, the opening duration of the intake valve of the operating cylinders is temporarily increased at reactivation from the cylinder deactivation mode. This compensates for the intake air amount of the operating cylinder reduced by the flow of intake air into the reactivated cylinder. Thus, reduction in intake air in the operating cylinder, the intake valve of which have been opened and closed even during execution of the cylinder deactivation mode, is restrained immediately after reactivation from the cylinder deactivation mode, and reduction in the output torque of the operating cylinder is restrained. Consequently, at reactivation from the cylinder deactivation mode, torque fluctuation that may occur due to overlap in the opening duration of the intake valves between the cylinders is restrained in a reliable manner.

In the above described controller, when overlap occurs in opening duration of the intake valves between the cylinders by controlling the valve actuation in accordance with the engine output requirement at reactivation from the cylinder deactivation mode, the control section preferably executes the intake amount correction process such that the intake air amount of the operating cylinder is increased as compared to a case in which the valve actuation is controlled in accordance with the engine output requirement during the cylinder deactivation mode.

With this configuration, the control section executes the intake amount correction process. If overlap occurs in the opening duration of the intake valves between the cylinders by controlling the valve actuation on the basis of the engine output requirement at reactivation from the cylinder deactivation mode, execution of the intake amount correction process changes the valve actuation such that the intake air amount of the operating cylinder is increased as compared to a case in which the valve actuation is controlled on the basis of the engine output requirement during the cylinder deactivation mode. Thus, immediately after reactivation from the cylinder deactivation mode, reduction in the intake air in the operating cylinder is restrained, so that reduction in the output torque in the operating cylinder is restrained. As a result, torque fluctuation that may occur due to overlap in the opening duration of the intake valves between the cylinders is restrained in a reliable manner at reactivation from the cylinder deactivation mode.

During execution of the intake amount correction process, the control section preferably controls the valve actuation such that the intake air amount of the operating cylinder obtained during reactivation from the cylinder deactivation mode approaches the intake air amount of the operating cylinder when combustion of air-fuel mixture is started in the cylinder reactivated from the cylinder deactivation mode.

In the above described controller, the control section preferably terminates execution of the intake amount correction process after a first combustion of air-fuel mixture after the reactivation from the cylinder deactivation mode in the cylinder reactivated from the cylinder deactivation mode.

If combustion of air-fuel mixture is started in the cylinder reactivated from the cylinder deactivation mode, the reactivated cylinder also starts to generate output torque. With this configuration, the intake amount correction process is terminated after the first combustion of air-fuel mixture is started in the cylinder reactivated from the cylinder deactivation mode after the reactivation from the cylinder deactivation mode and after the reactivated cylinder has started to generate output torque. Thus, reoccurrence of torque fluctuation caused by terminating execution of the intake amount correction process is restrained. The determination of whether air-fuel mixture has been burned in the cylinder may be made in any suitable manner. For example, the combustion of air-fuel mixture can be determined on the basis of torque fluctuation in the cylinder reactivated from the cylinder deactivation mode. Furthermore, it is also possible to determine combustion of air-fuel mixture by detecting engine vibration generated in combustion stroke of the cylinder reactivated from the cylinder deactivation mode with a knocking sensor. It is also possible to determine combustion of air-fuel mixture on the basis of the elapsed time after reactivation from the cylinder deactivation mode.

The variable valve actuation mechanism may be a multi-step variable valve actuation mechanism, which changes the valve actuation in multiple steps by selecting a valve actuation among a plurality of predetermined valve actuations. In such a multi-step variable valve actuation mechanism, unlike the continuous variable valve actuation mechanism, which is capable of continuously changing the valve actuation, the valve actuation cannot be finely adjusted. Thus, at reactivation from the cylinder deactivation mode, overlap tends to occur in the opening duration of the intake valves between the cylinders. Thus, in the multi-step variable valve actuation mechanism, a valve actuation during execution of the intake amount correction process is preferably set as one of predetermined valve actuations. In this case, even with the multi-step variable valve actuation mechanism, which cannot finely adjust the valve actuation, the torque fluctuation is restrained immediately after reactivation from the cylinder deactivation mode by executing the above-described intake amount correction process.

The internal combustion engine preferably includes a forced induction device, which increases pressure of intake air using exhaust gas The internal combustion engine, which includes a forced induction device, ensures the boost pressure during execution of the cylinder deactivation mode by exhaust gas pressure of the operating cylinder, the intake valve of which is opened and closed even during execution of the cylinder deactivation mode. If intake air also starts to flow into the reactivated cylinder due to reactivation from the cylinder deactivation mode, the intake air amount that flows into the operating cylinder is reduced by an amount corresponding to the intake air amount that flows into the reactivated cylinder. The reduction in intake air amount reduces the exhaust gas pressure of the operating cylinder and thus reduces the boost pressure. Since the reduction amount of the output torque when the intake air that flows into the operating cylinder is reduced in the internal combustion engine that includes the forced induction device is greater than a case with an internal combustion engine that does not include the forced induction device, the above-described torque fluctuation becomes significant. In this respect, the present configuration performs the above-described intake amount correction process to restrain reduction in intake air in the operating cylinder immediately after reactivation from the cylinder deactivation mode. This restrains the occurrence of torque fluctuation caused by reduction in the boost pressure immediately after reactivation from the cylinder deactivation mode.

The internal combustion engine preferably includes a recirculation passage, which recirculates some of exhaust gas to intake air.

In the internal combustion engine, in which the external EGR recirculates into the cylinders, when some of the intake air that has been flowing into the operating cylinder flows into the reactivated cylinder, which has been reactivated from the cylinder deactivation mode, at reactivation from the cylinder deactivation mode, some of the external EGR that has been flowing into the operating cylinder also starts to flow into the reactivated cylinder. Thus, the external EGR amount that flows into the operating cylinder is changed, causing the combustion state of the operating cylinder to be changed. The change in the combustion state may result in torque fluctuation. In this respect, since the present configuration performs the above-described intake amount correction process to restrain reduction in the intake air in the operating cylinder immediately after reactivation from the cylinder deactivation mode, change in the external EGR amount that flows into the operating cylinder is also restrained. Thus, the occurrence of torque fluctuation caused by change in the external EGR amount that flows into the cylinder is restrained immediately after reactivation from the cylinder deactivation mode.

MODES FOR CARRYING OUT THE INVENTION

A controller for a variable valve actuation mechanism according to one embodiment applied to an inline four-cylinder engine will now be described with reference to FIGS. 1 to 11.

Figure 1:
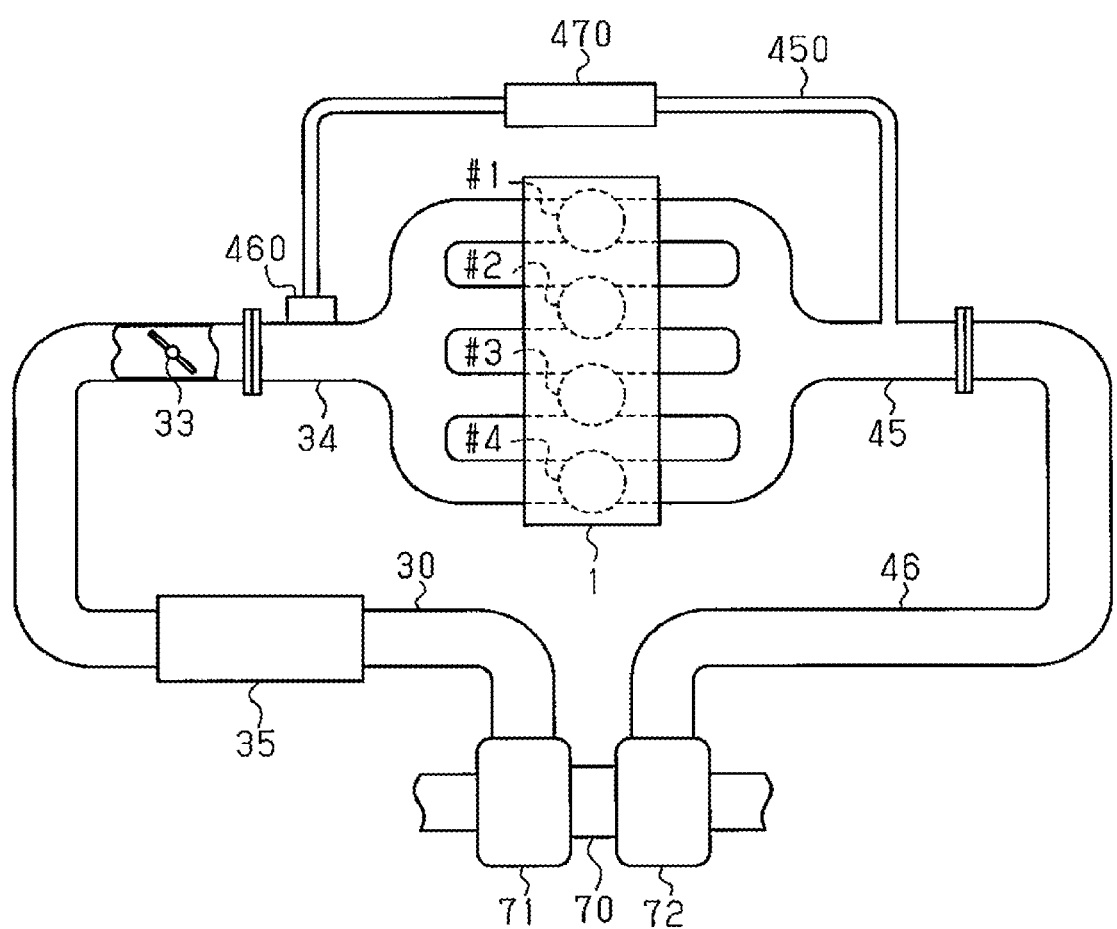
FIG. 1 is a schematic diagram illustrating a general arrangement of an internal combustion engine to which a controller for a variable valve actuation mechanism according to one embodiment is applied.

As shown in FIG. 1, an engine 1 includes four cylinders arranged in series, which are, a first cylinder #1, a second cylinder #2, a third cylinder #3, and a fourth cylinder #4.

The engine 1 also includes fuel injection valves, which inject fuel into the cylinders. Furthermore, an intake manifold 34, which introduces intake air into the cylinders, and an exhaust manifold 45, which discharges exhaust gas from the cylinders, are connected to the engine 1.

The intake manifold 34 is connected to an intake passage 30. A throttle valve 33, which regulates the intake air amount, is located in the intake passage 30.

The exhaust manifold 45 is connected to an exhaust passage 46.

The engine 1 includes a forced induction device for increasing the pressure of intake air using exhaust gas. The forced induction device is a turbocharger 70. A compressor housing 71, which accommodates the compressor of the turbocharger 70, is connected to the middle of the intake passage 30, that is, a section of the intake passage 30 upstream of the throttle valve 33 in the intake air flow direction. An intercooler 35 is located in the intake passage 30 between the compressor housing 71 and the throttle valve 33. The intercooler 35 cools intake air the temperature of which has increased by forced induction of the turbocharger 70. Furthermore, a turbine housing 72, which accommodates the turbine of the turbocharger 70, is connected to the middle of the exhaust passage 46.

The engine 1 further includes an exhaust gas recirculation apparatus (hereinafter, referred to as an EGR apparatus). The exhaust gas recirculation apparatus includes a recirculation passage, which recirculates some of exhaust gas to the intake air as external EGR. More specifically, the recirculation passage is an EGR passage 450, which connects the intake manifold 34 to the exhaust manifold 45. The EGR apparatus further includes an EGR cooler 470, which is located in the middle of the EGR passage 450, and an EGR valve 460, which regulates the amount of the external EGR recirculated to the intake air. When the engine 1 is operated under low load, the required intake air amount is small. Thus, a relatively large amount of external EGR can be introduced into the cylinders. For this reason, during low-load operation, the amount of external EGR recirculated to the intake air is increased as compared to a case of high-load operation.

Figure 2:
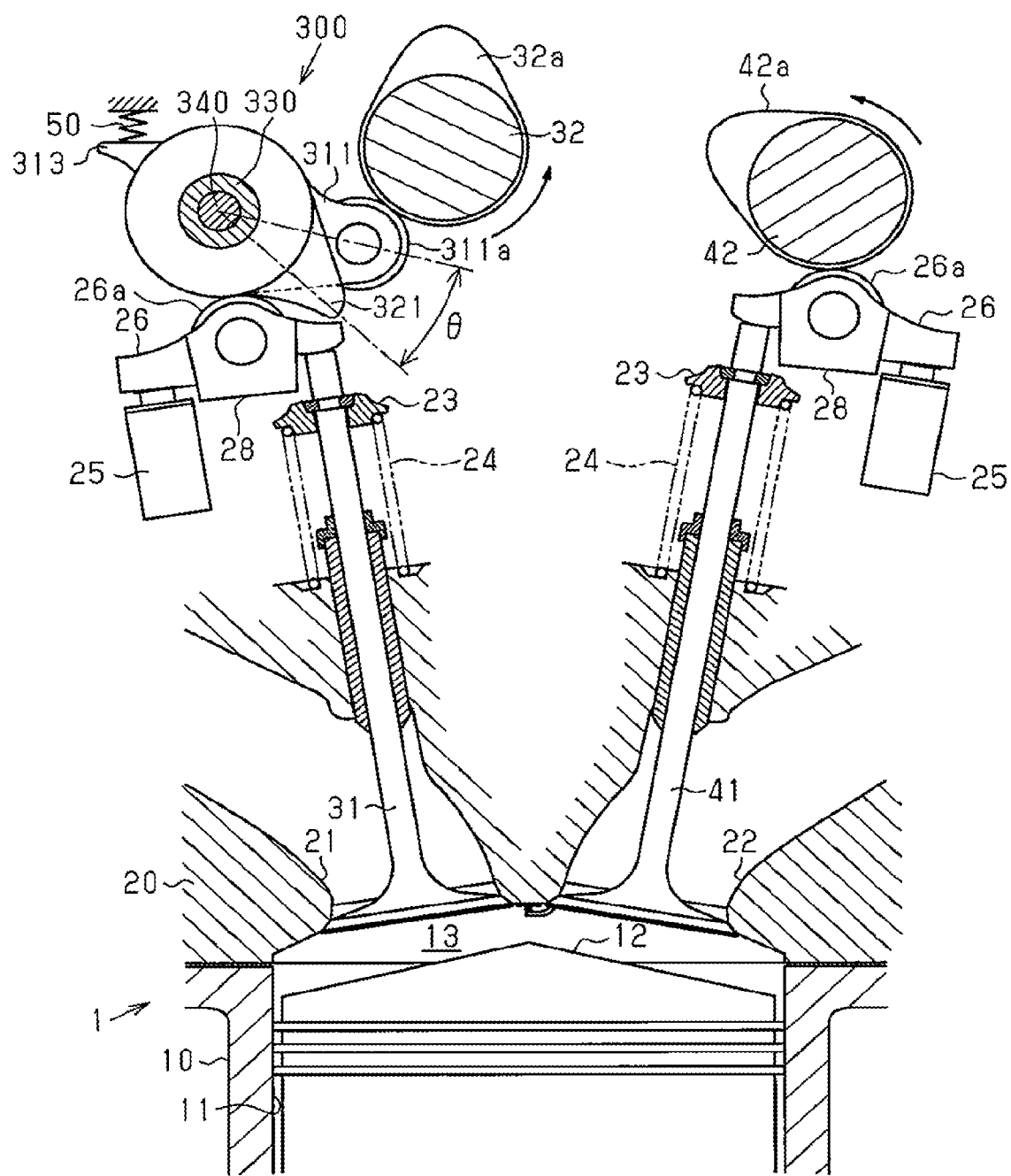
FIG. 2 is a cross-sectional view of a cylinder head of the internal combustion engine according to the embodiment and the surrounding structure.

As shown in FIG. 2, the engine 1 includes a cylinder block 10 and a cylinder head 20, which is placed on the cylinder block 10.

FIG. 2 shows a cylinder bore 11, which corresponds to one of the cylinders formed in the cylinder block 10. Each cylinder bore 11 slidably accommodates a piston 12. The cylinder head 20 is mounted on the upper section of the cylinder block 10 so that the inner circumferential surface of each cylinder bore 11, the upper surface of the associated piston 12, and the lower surface of the cylinder head 20 define a combustion chamber 13.

Intake ports 21 and exhaust ports 22, which communicate with the combustion chambers 13, are formed in the cylinder head 20. Each intake port 21 is provided with an intake valve 31, which connects and disconnects the associated combustion chamber 13 to the intake port 21. Each exhaust port 22 is provided with an exhaust valve 41, which connects and disconnects the associated combustion chamber 13 to the exhaust port 22. Each of the valves 31, 41 is urged by a valve spring 24 in a valve closing direction.

In addition, lash adjusters 25 are provided in the cylinder head 20 corresponding to the valves 31, 41. A rocker arm 26 is located between each lash adjuster 25 and the associated one of the valves 31, 41. One end of each rocker arm 26 is supported by the associated lash adjuster 25, and the other end of the rocker arm 26 contacts the end portion of the associated one of the valves 31, 41.

Furthermore, the cylinder head 20 rotationally supports an intake camshaft 32, which actuates the intake valves 31, and an exhaust camshaft 42, which actuates the exhaust valves 41.

The intake camshaft 32 includes intake cams 32a, and the exhaust camshaft 42 includes exhaust cams 42a.

The outer circumferential surface of each exhaust cam 42a abuts against a roller 26a of the associated rocker arm 26, which abuts against the exhaust valve 41. When the exhaust camshaft 42 is rotated so that the exhaust cam 42a presses the roller 26a of the rocker arm 26, the rocker arm 26 of the exhaust valve 41 pivots about a portion supported by the lash adjuster 25, which serves as a fulcrum. The pivoting of the rocker arm 26 opens and closes the exhaust valve 41.

A variable actuation mechanism 300 is provided for each cylinder and is located between the rocker arm 26, which abuts against the intake valve 31, and the intake cam 32a. The variable actuation mechanism 300 changes the valve actuation of the intake valve 31. The variable actuation mechanism 300 configures part of a variable valve actuation mechanism 600 and has an input arm 311 and an output arm 321. The input arm 311 and the output arm 321 are pivotally supported about a support pipe 330, which is secured to the cylinder head 20. The rocker arm 26 is urged by the urging force of the valve spring 24 toward the output arm 321, and a roller 26a located at the middle part of the rocker arm 26 abuts against the outer circumferential surface of the output arm 321.

Furthermore, the variable actuation mechanism 300 includes a protrusion 313 formed on the outer circumferential surface of the variable actuation mechanism 300. The urging force of a spring 50, which is secured in the cylinder head 20, acts on the protrusion 313. The urging force of the spring 50 causes a roller 311a, which is provided at the distal end of the input arm 311, to abut against the outer circumferential surface of the intake cam 32a. When the intake camshaft 32 is rotated, operation of the intake cam 32a causes the variable actuation mechanism 300 to pivot about the support pipe 330. As the roller 26a of the rocker arm 26 is pressed by the output arm 321, the rocker arm 26 of the intake valve 31 pivots about the portion supported by the lash adjuster 25, which serves as a fulcrum. The pivoting of the rocker arm 26 causes the intake valve 31 to open and close.

A control shaft 340, which is movable in the axial direction, is inserted in the above-described support pipe 330. The variable actuation mechanism 300 changes the relative phase difference of the input arm 311 and the output arm 321 about the support pipe 330, that is, the angle θ shown in FIG. 2 by shifting the control shaft 340 in the axial direction.

Beside an all cylinder operation mode, in which all the cylinders are operated, the above-described engine 1 is configured to be capable of operating in a cylinder deactivation mode, which improves the fuel efficiency in the low-load region by deactivating some of the cylinders and operating only the remaining cylinders.

Such a cylinder deactivation mode is performed by stopping fuel injection and ignition of air-fuel mixture in some of the cylinders of the engine 1 and stopping opening and closing of the intake valves 31 and the exhaust valves 41 to keep the valves 31, 41 closed. Furthermore, reactivation from the cylinder deactivation mode to the all cylinder operation mode is performed by restarting opening and closing operation of the intake valves 31 and the exhaust valves 41, fuel injection, and ignition of air-fuel mixture in the cylinders that have been deactivated.

The opening and closing operation of the intake valve 31 and the exhaust valve 41 is stopped by a valve stop mechanism 28 located in the rocker arm 26 that opens and closes the intake valve 31 and a valve stop mechanism 28 located in the rocker arm 26 that opens and closes the exhaust valve 41. The engine 1 is an inline four-cylinder engine, and ignition of air-fuel mixture is performed in the order of the first cylinder #1, the third cylinder #3, the fourth cylinder #4, and the second cylinder #2. In the present embodiment, the third cylinder #3 and the second cylinder #2 are set as cylinders to be deactivated in the cylinder deactivation mode, that is, the deactivated cylinders. The valve stop mechanism 28 is provided corresponding to only the deactivated cylinders.

When the valve stop mechanism 28 is operated, the roller 26a of the rocker arm 26 is allowed to move relative to the rocker arm 26 in the above-described pressing direction. When the valve stop mechanism 28 is not operated, such a relative movement is restricted. As described above, when the valve stop mechanism 28 is not operated, the relative movement of the roller 26a with respect to the rocker arm 26 is restricted. Thus, when the output arm 321 or the exhaust cam 42a presses the associated roller 26a, the rocker arm 26 of the intake valve 31 or the rocker arm 26 of the exhaust valve 41 pivots as described above so that the associated intake valve 31 or the associated exhaust valve 41 is opened or closed. When the valve stop mechanism 28 is operated, the roller 26a moves relative to the rocker arm 26. Thus, when the output arm 321 or the exhaust cam 42a presses the associated roller 26a, the roller 26a moves relative to the rocker arm 26. This results in the output arm 321 or the exhaust cam 42a missing the rocker arm 26, and the pivoting of the rocker arm 26 is stopped. Thus, opening and closing of the intake valve 31, which accompanies the rotation of the intake cam 32a, is stopped, and the intake valve 31 is kept closed by the urging force of the valve spring 24. Opening and closing of the exhaust valve 41, which accompanies the rotation of the exhaust cam 42a, is also stopped, and the exhaust valve 41 is kept closed by the urging force of the valve spring 24.

The structure of the variable actuation mechanism 300 will now be described with reference to FIG. 3.

Figure 3:
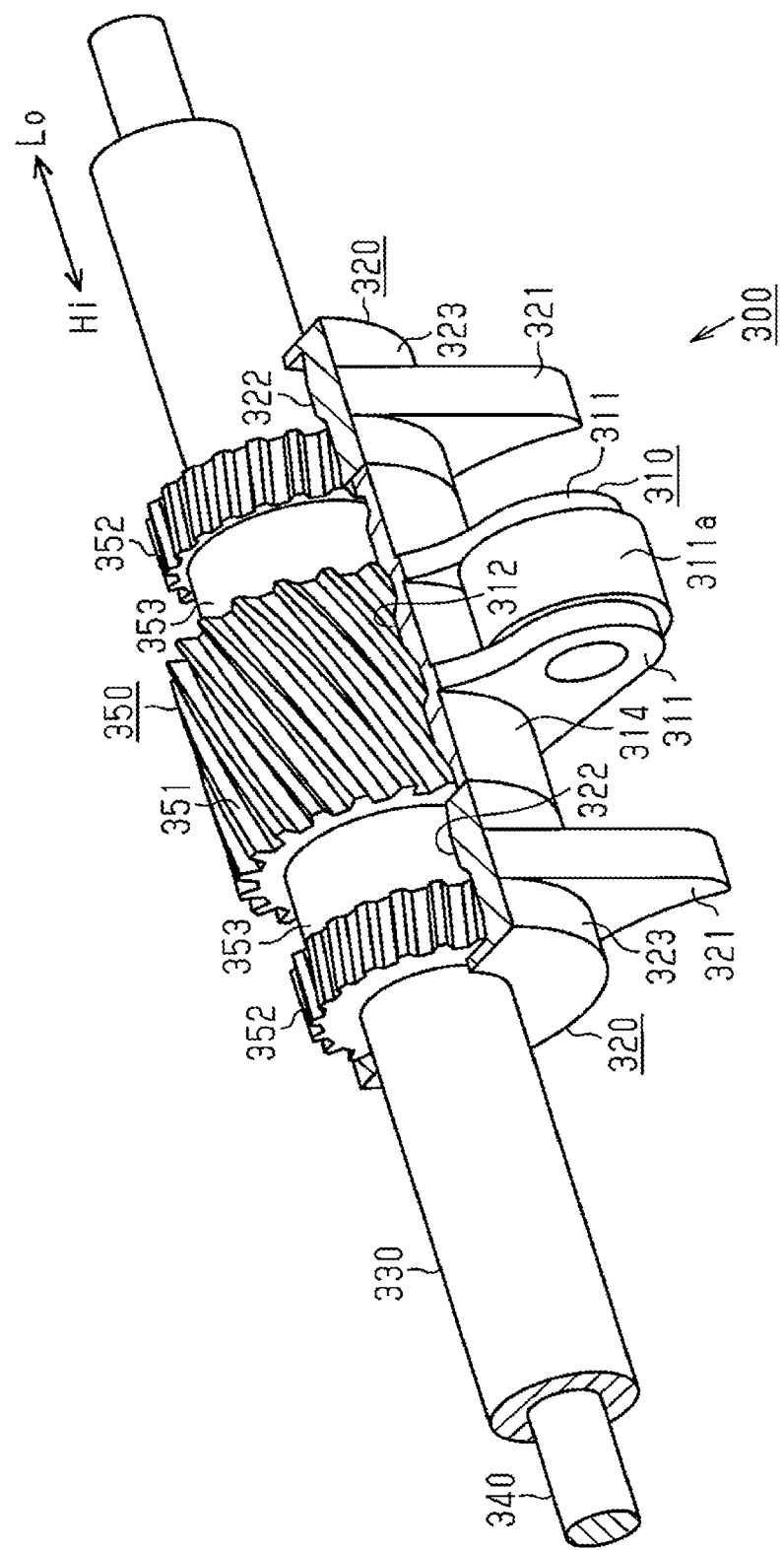
FIG. 3 is a perspective view, with a part cut away, of a variable actuation mechanism according to the embodiment.

As shown in FIG. 3, the variable actuation mechanism 300 includes an input portion 310 and output portions 320 arranged on both sides of the input portion 310.

The input portion 310 and the output portions 320 respectively have hollow cylindrical housings 314, 323 through which the support pipe 330 is inserted.

A helical spline 312 is formed on the inner circumference of the housing 314 of the input portion 310. Helical splines 322, which have a tooth trace opposite to that of the helical spline 312 of the input portion 310, are formed on the inner circumferences of the housings 323 of the output portions 320.

A slider gear 350 is located in a series of internal spaces formed by the housings 314, 323 of the input portion 310 and the two output portions 320. The slider gear 350 has a hollow cylindrical shape and is arranged to be capable of reciprocating in the axial direction of the support pipe 330 on the outer circumferential surface of the support pipe 330 and to be capable of relatively rotating about the axis of the support pipe 330.

A helical spline 351, which meshes with the helical spline 312 of the input portion 310, is formed on the outer circumferential surface of the center portion of the slider gear 350 in the axial direction. Helical splines 352, which mesh with the helical splines 322 of the output portions 320, are formed on the outer circumferential surface of the opposite ends of the slider gear 350 in the axial direction.

A control shaft 340, which is movable in the axial direction of the support pipe 330, is located in the support pipe 330. The control shaft 340 is engaged with the slider gear 350 with a pin so that the slider gear 350 moves in the axial direction in accordance with the axial movement of the control shaft 340, while being pivotal with respect to the support pipe 330.

The variable actuation mechanism 300 configured as described above allows the slider gear 350 to move in the axial direction in conjunction with the movement of the control shaft 340 when the control shaft 340 moves in the axial direction. The helical splines 351, 352 formed on the outer circumferential surface of the slider gear 350 have the tooth traces formed in different directions and mesh with the helical splines 312, 322 formed on the inner circumferential surface of the input portion 310 and the output portions 320. Thus, when the slider gear 350 moves in the axial direction, the input portion 310 and the output portions 320 rotate in the opposite directions. As a result, the relative phase difference between the input arm 311 and the output arm 321 is changed, and the maximum lift and the opening duration, which are valve actuation of the intake valve 31, are changed. More specifically, when the control shaft 340 is moved in the direction of arrow Hi shown in FIG. 3, the slider gear 350 moves in the direction of arrow Hi together with the control shaft 340. The movement of the slider gear 350 increases the relative phase difference between the input arm 311 and the output arm 321, that is, the angle θ shown in FIG. 2. Thus, the maximum lift VL and the opening duration INCAM of the intake valve 31 are increased, resulting in increase in the intake air amount. When the control shaft 340 is moved in the direction of arrow Lo shown in FIG. 3, the relative phase difference between the input arm 311 and the output arm 321, that is, the angle θ shown in FIG. 2 is reduced as the slider gear 350 moves in the direction of arrow Lo together with the control shaft 340. This causes the maximum lift VL and the opening duration INCAM of the intake valve 31 to be reduced, resulting in a decrease in the intake air amount.

The configuration of a drive portion that moves the control shaft 340 of the variable valve actuation mechanism 600 in the axial direction will now be described.

Figure 4:
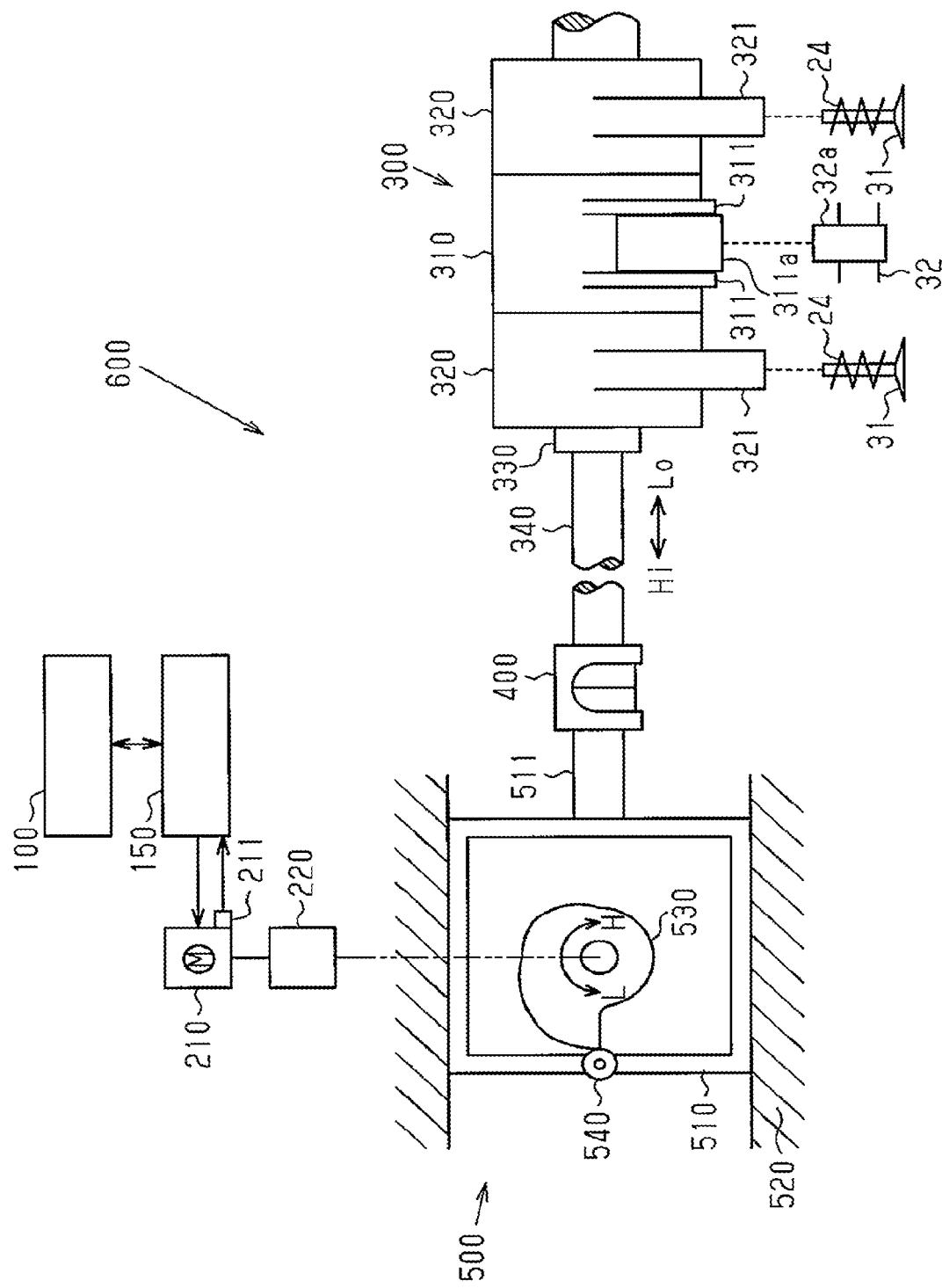
FIG. 4 is a schematic diagram illustrating a multi-step variable valve actuation mechanism according to the embodiment.

As shown in FIG. 4, the drive portion of the variable valve actuation mechanism 600 includes, an electric motor 210, a speed reducing mechanism 220, which reduces the rotational speed of the motor 210, and a conversion mechanism 500, which converts rotation of the speed reducing mechanism 220 to linear motion of the control shaft. A rotational angle sensor 211, which detects the rotational angle of the motor 210, is provided on the motor 210.

The speed reducing mechanism 220 includes multiple gears. The input shaft of the speed reducing mechanism 220 is connected to the output shaft of the motor 210, and the output shaft of the speed reducing mechanism 220 is connected to a cam 530 provided in the conversion mechanism 500.

The conversion mechanism 500 includes a holder 510 and a guide 520, which guides the movement of the holder 510. The holder 510 reciprocates along the guide 520. A coupling shaft 511, which extends toward the control shaft 340, is mounted on the holder 510. The end of the coupling shaft 511 is coupled to the end of the control shaft 340 close to the coupling shaft 511 with a coupling member 400.

The cam 530, which is rotated by the output shaft of the speed reducing mechanism 220, is located in the holder 510. Furthermore, a roller 540 is rotationally attached to the holder 510, and the cam surface of the cam 530 abuts against the roller 540.

When the cam 530 is rotated, the holder 510 moves along the guide 520. The holder 510 serves as a follower, which is a member to which motion of the cam 530 is transmitted. The movement of the holder 510 causes the control shaft 340 to be shifted in the axial direction, which is a direction in which the central axis of the control shaft 340 extends.

A motor controller 150, which is a control section for controlling activation of the motor 210, is connected to the motor 210. The rotational angle of the motor 210 is controlled in accordance with activation signals from the motor controller 150. The motor controller 150 is connected to an engine controller 100, which controls the operating condition of the engine 1.

The engine controller 100 receives the degree of depression of the acceleration pedal detected by an acceleration pedal depression sensor and the crank angle detected by a crank angle sensor. The engine controller 100 calculates required intake air amount corresponding to the engine output requirement on the basis of, for example, the engine rotational speed NE and the degree of depression of the acceleration pedal ACCP calculated from the crank angle and calculates the maximum lift of the intake valve 31 that achieves the required intake air amount. Subsequently, the engine controller 100 sets the calculated maximum lift as a target lift VLp. When the target lift VLp is set in this manner, the motor controller 150 calculates the rotational phase of the cam 530 corresponding to the target lift VLp and controls the rotational angle of the motor 210 such that the calculated rotational phase is obtained.

Furthermore, the motor controller 150 calculates the rotational phase of the cam 530 from the rotational angle of the motor 210 detected by the rotational angle sensor 211 and calculates the current value of the maximum lift VL from the calculated rotational phase. The motor controller 150 then transmits the current value of the calculated maximum lift VL to the engine controller 100.

The cam 530, which shifts the control shaft 340, will now be described in detail.

Figure 5:
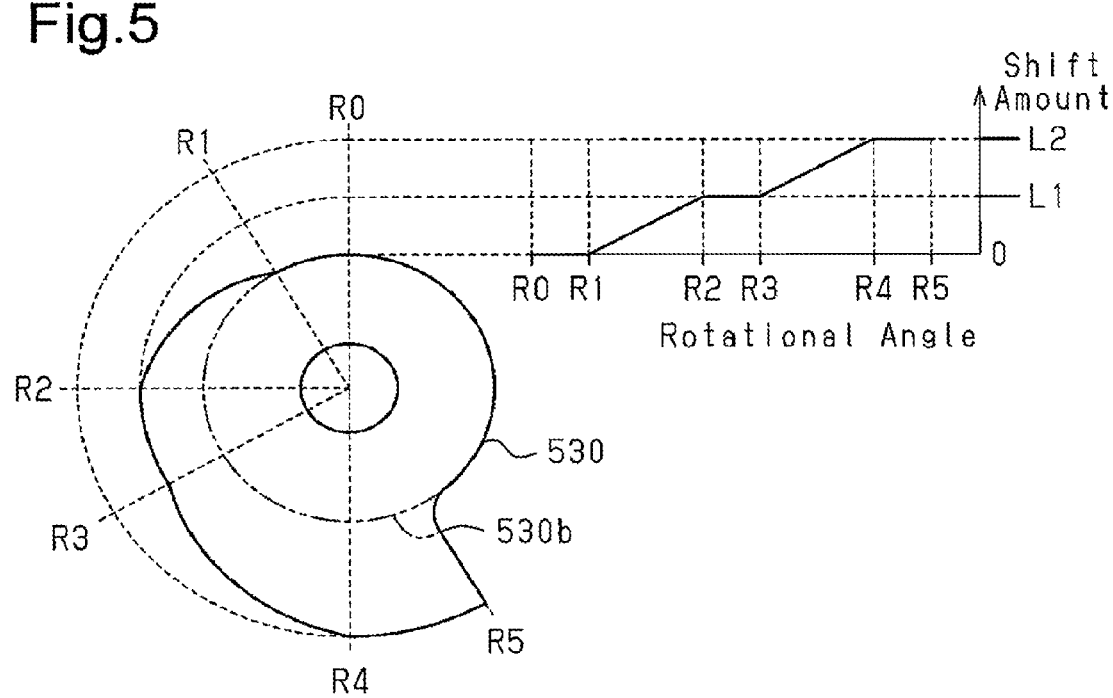
FIG. 5 is a diagram illustrating a cam profile provided on the multi-step variable valve actuation mechanism.

As shown in FIG. 5, changing sections (a section from a first rotational phase R1 to a second rotational phase R2, and a section from a third rotational phase R3 to a fourth rotational phase R4 shown in FIG. 5) are provided on the cam surface of the cam 530. In the changing sections, the cam diameter is gradually increased in one direction so that the shift amount of the control shaft 340 is linearly increased. Furthermore, maintaining sections (a section from the second rotational phase R2 to the third rotational phase R3, a section from the fourth rotational phase R4 to a fifth rotational phase R5, and a section from the first rotational phase R1 to a reference rotational phase R0, in which the roller 540 contacts a reference circle 530b of the cam 530 shown in FIG. 5) are also provided on the cam surface of the cam 530. In the maintaining sections, the cam diameter is constant, and the shift amount of the control shaft 340 is held constant without any change.

In the following description, a direction in which the rotational phase of the cam 530 is changed from the first rotational phase R1 to the second rotational phase R2 and to the third rotational phase R3 (a direction in which the cam 530 is rotated rightward (clockwise) in FIG. 5) is defined as a direction in which the rotational phase of the cam 530 is increased. The above-described reference rotational phase R0 is the minimum rotational phase in variably controlling the rotational phase of the cam 530.

When the rotational phase of the cam 530 is in the section from the reference rotational phase R0 to the first rotational phase R1, the shift amount of the control shaft 340 is maintained at zero. Furthermore, when the rotational phase of the cam 530 is in the section from the second rotational phase R2 to the third rotational phase R3, the shift amount of the control shaft 340 is maintained at a constant value L1. When the rotational phase of the cam 530 is in the section from the fourth rotational phase R4 to the fifth rotational phase R5, the shift amount of the control shaft 340 is maintained at a constant value L2 greater than the above-described value L1.

Figure 6:
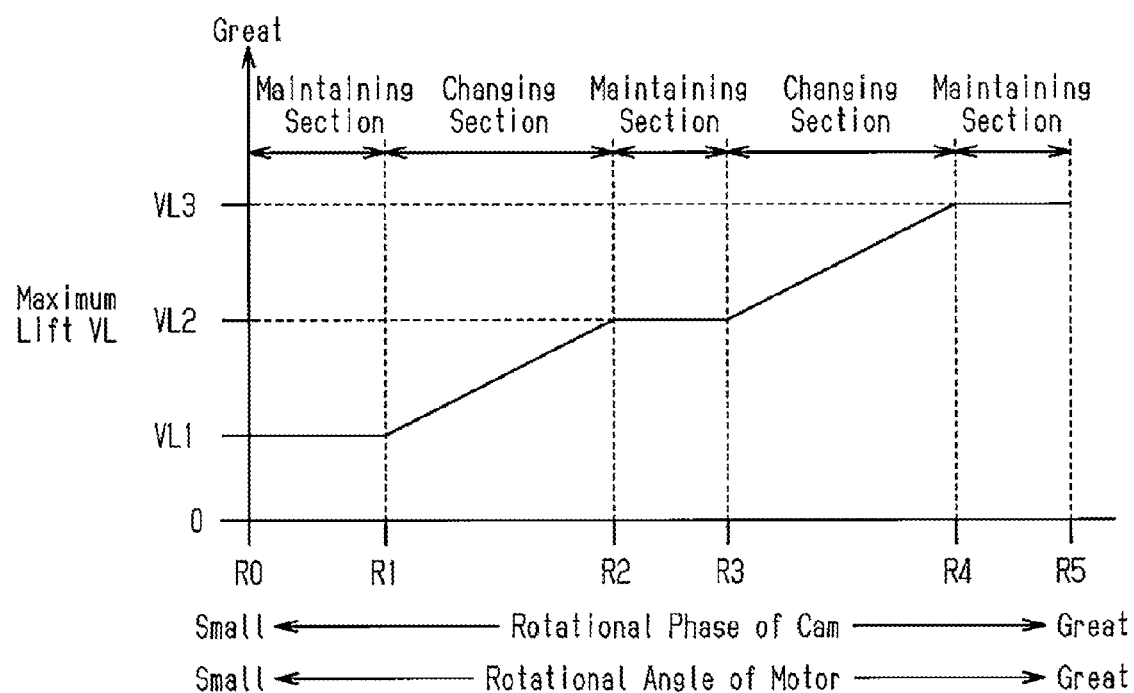
FIG. 6 is a graph showing a manner in which the maximum lift is changed by the multi-step variable valve actuation mechanism.

With the cam surface of the cam 530 having the above-described cam profile, when the rotational phase of the cam 530 rotates within a range from the reference rotational phase R0 to the fifth rotational phase R5, the maximum lift VL of the intake valve 31 is changed as shown in FIG. 6.

As shown in FIG. 6, when the rotational angle of the motor 210 is increased, the rotational phase of the cam 530 is also gradually increased. In the section before the first rotational phase R1, where the roller 540 contacts the reference circle 530*b* of the cam 530, the shift amount of the control shaft 340 is zero, and the maximum lift VL is maintained at the first lift VL1. The first lift VL1 is the minimum value of the maximum lift VL. The shift amount of the control shaft 340 is gradually increased in a process in which the rotational phase of the cam 530 is changed from the first rotational phase R1 to the second rotational phase R2. Thus, the maximum lift VL is gradually increased from the first lift VL1.

The shift amount of the control shaft 340 is maintained at the constant value L1 when the rotational phase of the cam 530 is in the section from the second rotational phase R2 to the third rotational phase R3. Thus, the maximum lift VL is maintained at the second lift VL2, which is greater than the first lift VL1. The shift amount of the control shaft 340 is gradually increased in a process in which the rotational phase of the cam 530 is changed from the third rotational phase R3 to the fourth rotational phase R4. Thus, the maximum lift VL is gradually increased from the second lift VL2.

The shift amount of the control shaft 340 is maintained at the value L2, which is greater than the above-described value L1 when the rotational phase of the cam 530 is in a section from the fourth rotational phase R4 to the fifth rotational phase R5. Thus, the maximum lift VL is maintained at a third lift VL3, which is greater than the second lift VL2. The third lift VL3 is the maximum value of the maximum lift VL.

Figure 7:
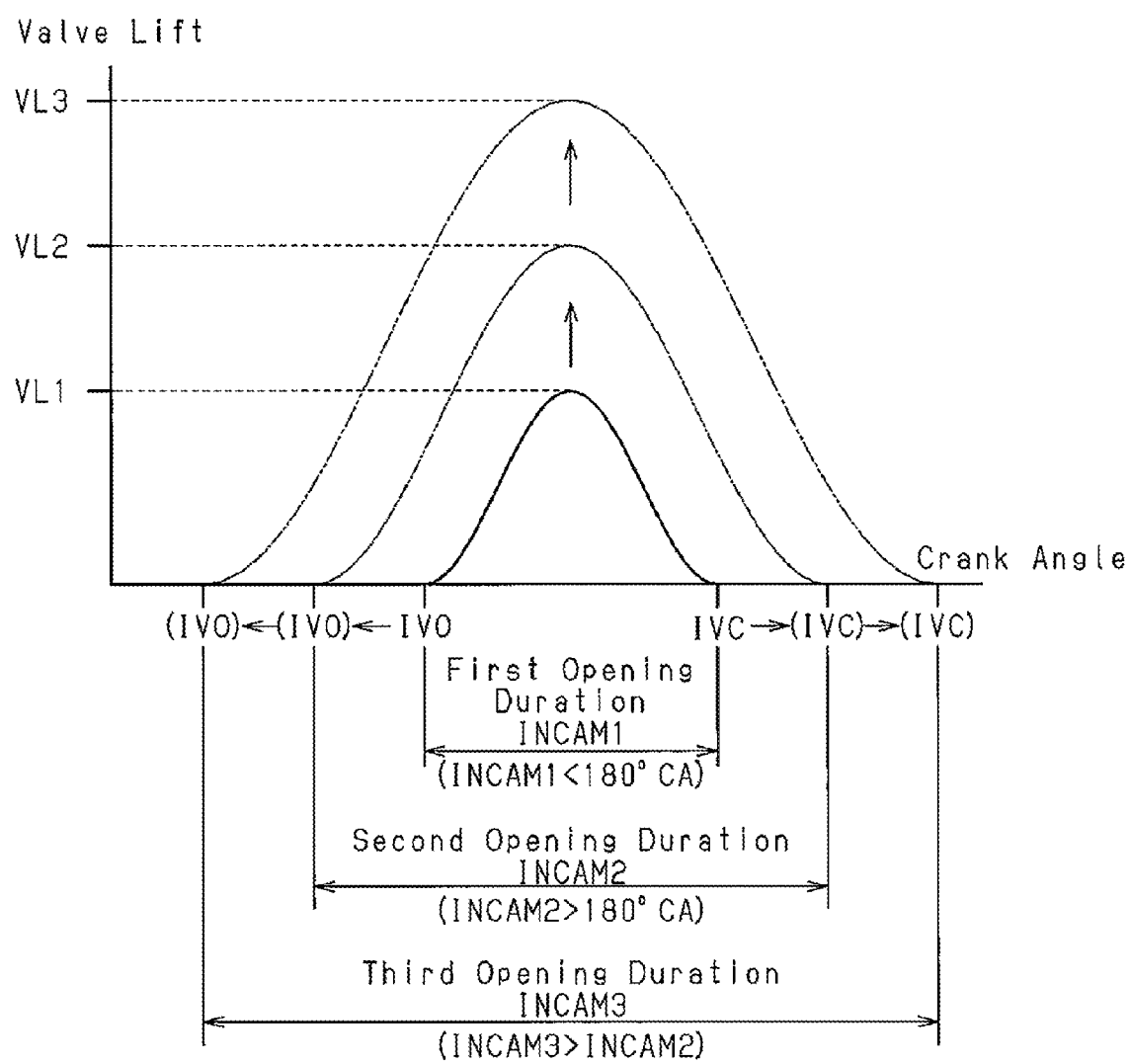
FIG. 7 is a graph showing a manner in which opening duration is changed by the multi-step variable valve actuation mechanism.

As shown in FIG. 7, as the maximum lift VL of the intake valve 31 is increased in the order of the first lift VL1, the second lift VL2, and the third lift VL3, the valve opening timing IVO of the intake valve 31 is advanced, and the valve closing timing IVC is retarded. This results in increase in the opening duration INCAM. A first opening duration INCAM1, which is the opening duration INCAM during which the maximum lift VL is set to the first lift VL1, is set to a period shorter than 180° C.A. A second opening duration INCAM2, which is the opening duration INCAM during which the maximum lift VL is set to the second lift VL2, is set to a period longer than 180° C.A. A third opening duration INCAM3, which is the opening duration INCAM during which the maximum lift VL is set to the third lift VL3, is set to a period longer than the second opening duration INCAM2.

The variable valve actuation mechanism 600 selects, as the target lift VLp of the intake valve 31, one of the above-described first lift VL1, the second lift VL2, and the third lift VL3 in accordance with the engine operating condition. The maximum lift VL of the intake valve 31 is changed in three steps in accordance with the engine operating condition by maintaining the selected maximum lift. In this manner, the variable valve actuation mechanism 600 is utilized as a multi-step variable valve actuation mechanism, which changes the valve actuation in multiple steps by selecting a valve actuation among the previously set valve actuations. During execution of the cylinder deactivation mode, the above-described first lift VL1 or the second lift VL2 is selected as the target lift VLp of the intake valve 31.

Figure 8:
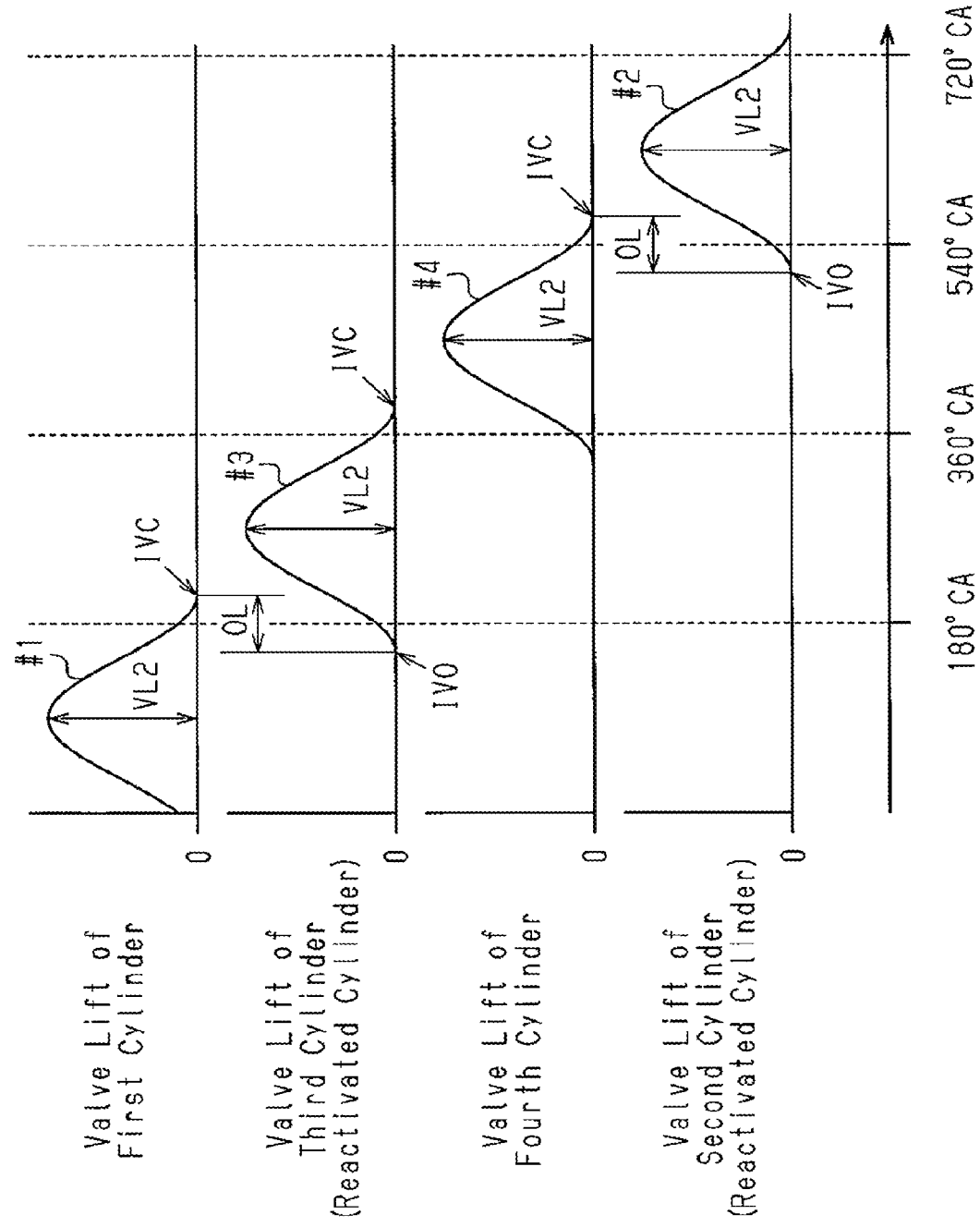
FIG. 8 is a diagram illustrating an overlap state of opening duration between the cylinders at reactivation from a cylinder deactivation mode.

FIG. 8 shows the opening durations of the intake valves 31 when the internal combustion engine is reactivated from the cylinder deactivation mode, and an overlap state of the opening durations of the intake valves 31 between the cylinders. FIG. 8 shows an example of a case in which the target lift VLp set on the basis of the engine output requirement during execution of the cylinder deactivation mode is the second lift VL2.

As shown in FIG. 8, upon reactivation from the cylinder deactivation mode, the intake valves 31 of the deactivated cylinders (the third cylinder #3 and the second cylinder #2), which have been kept closed, start the opening and closing operation. As shown in FIG. 7, the second opening duration INCAM2, which is the opening duration INCAM of the intake valve 31 when the maximum lift VL is set to the second lift VL2, is an opening duration greater than 180° C.A. In the inline four-cylinder engine, the starting of the intake stroke of each cylinder is displaced by 180° C.A in the order of ignition. Thus, when the opening duration INCAM of the intake valve 31 is longer than 180° C.A, the opening duration of the intake valve 31 in each cylinder partially overlaps between the cylinders as shown in FIG. 8.

That is, part of the opening duration of the intake valve 31 of the third cylinder #3, which is one of the reactivated cylinders the intake valves 31 of which have started to open and close, overlaps part of the opening duration of the intake valve 31 of the first cylinder #1, which is one of the operating cylinders the intake valves 31 of which have been opened and closed even during execution of the cylinder deactivation mode. More specifically, the intake valve 31 of the third cylinder #3 is opened before the intake valve 31 of the first cylinder #1 is closed. Thus, the intake valves 31 are both opened from the valve opening timing IVO of the intake valve 31 of the third cylinder #3 to the valve closing timing IVC of the intake valve 31 of the first cylinder #1. This generates an overlap amount OL in the opening durations of the intake valves 31.

Similarly, part of the opening duration of the intake valve 31 of the second cylinder #2, which is one of the reactivated cylinders the intake valves 31 of which have started to open and close, overlaps part of the opening duration of the intake valve 31 of the fourth cylinder #4, which is one of the operating cylinders the intake valves 31 of which have been opened and closed even during execution of the cylinder deactivation mode. More specifically, the intake valve 31 of the second cylinder #2 is opened before the intake valve 31 of the fourth cylinder #4 is closed. Thus, the intake valves 31 are both opened from the valve opening timing IVO of the intake valve 31 of the second cylinder #2 to the valve closing timing IVC of the intake valve 31 of the fourth cylinder #4. This generates an overlap amount OL in the opening durations of the intake valves 31.

As described above, if overlap occurs between the opening durations of the intake valves 31 of the first cylinder #1 and the third cylinder #3, some of the intake air that has been flowing toward the first cylinder #1, which has been operated even during cylinder deactivation mode, also flows into the third cylinder #3, which is one of the reactivated cylinders. Thus, the intake air that flows into the first cylinder #1 is reduced, resulting in decrease in the output torque of the first cylinder #1. Although some of the intake air starts to flow into the third cylinder #3, output torque is not generated by the third cylinder #3 until combustion of the air-fuel mixture is started after reactivation from the cylinder deactivation mode. Thus, output torque of the engine 1 may be reduced and cause torque fluctuation immediately after reactivation from the cylinder deactivation mode and until output torque is generated in the third cylinder #3.

Similarly, if overlap occurs between the opening durations of the intake valves 31 of the fourth cylinder #4 and the second cylinder #2, some of the intake air that has been flowing toward the fourth cylinder #4, which has been operated even during the cylinder deactivation mode, flows into the second cylinder #2, which is one of the reactivated cylinders. Thus, the intake air that flows into the fourth cylinder #4 is reduced, resulting in decrease in the output torque of the fourth cylinder #4. Although some of the intake air starts to flow into the second cylinder #2, output torque is not generated in the second cylinder #2 until combustion of the air-fuel mixture is started after reactivation from the cylinder deactivation mode. Thus, the output torque of the engine 1 may be reduced and cause torque fluctuation immediately after reactivation from the cylinder deactivation mode and until output torque is generated in the second cylinder #2.

In order to cope with such situation, the present embodiment prevents torque fluctuation that may occur due to overlap of opening durations of the intake valves 31 between cylinders at reactivation from the cylinder deactivation mode in the following manner.

Figure 9:
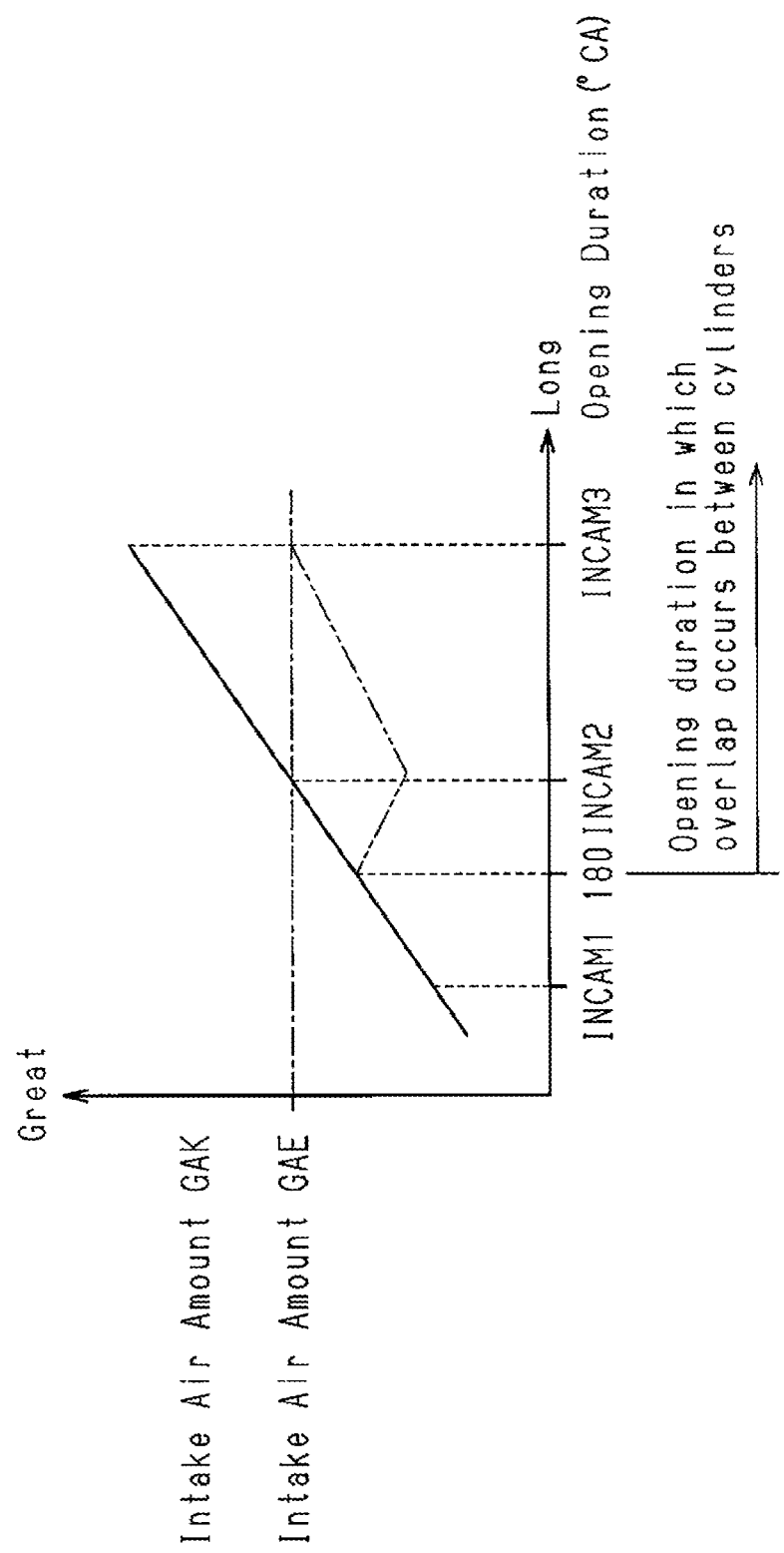
FIG. 9 is a graph showing the relationship between the opening duration and the amount of air drawn into each operating cylinder at reactivation from the cylinder deactivation mode.

FIG. 9 shows the relationship between the opening duration of the intake valve 31 and the intake air amount GAK drawn into one of the operating cylinders, the intake valves 31 of which have been opened and closed even during execution of the cylinder deactivation mode. The solid line shown in FIG. 9 represents the relationship during execution of the all cylinder operation mode, and the long dashed double-short dashed line in FIG. 9 represents the relationship at reactivation from the cylinder deactivation mode.

As shown in FIG. 9, during execution of the all cylinder operation mode, the intake air amount GAK drawn into each operating cylinder is increased as the opening duration is increased. For example, the intake air amount GAK drawn into each operating cylinder is increased as the opening duration INCAM of the intake valve 31 changes from the first opening duration INACM1, the second opening duration INCAM2, and to the third opening duration INCAM3.

If the opening duration exceeds 180° C.A at reactivation from the cylinder deactivation mode, overlap occurs in the opening durations of the intake valves 31 between the cylinders. As described above, since some of the intake air that has been flowing into the operating cylinders starts to also flow into the reactivated cylinders, the intake air amount GAK that is drawn into each operating cylinder is reduced. However, the intake air amount GAK drawn into the operating cylinders is increased as the opening duration is increased. Thus, if the opening duration is extended to some degree, the intake air amount GAK drawn into each operating cylinder starts to increase. That is, in a region in which the opening duration of the intake valve 31 is greater than 180° C.A, the intake air amount GAK drawn into each operating cylinder is temporarily reduced in accordance with the increase in the opening duration at reactivation from the cylinder deactivation mode, and the intake air amount GAK is increased again. Thus, even if overlap occurs in the opening durations of the intake valves 31 between the cylinders, decrease in the intake air amount GAK drawn into each operating cylinder is prevented by setting the opening duration INCAM of the intake valve 31 to be sufficiently long at reactivation from the cylinder deactivation mode. In the present embodiment, if overlap occurs in the opening durations of the intake valves 31 between the cylinders by controlling the valve actuation of the intake valves 31 on the basis of the engine output requirement at reactivation from the cylinder deactivation mode, an intake amount correction process is executed. The intake amount correction process controls the valve actuation of the intake valves 31 such that the intake air amount GAK is increased as compared to a case in which the valve actuation is controlled on the basis of the engine output requirement during the cylinder deactivation mode.

More specifically, during execution of the intake amount correction process, the valve actuation of the intake valves 31 is controlled such that the intake air amount GAK obtained during reactivation from the cylinder deactivation mode approaches (ideally, becomes equal to) the intake air amount GAK when combustion is started in the cylinders reactivated from the cylinder deactivation mode. This is embodied by setting the length of the above-described third opening duration INCAM3 such that the intake air amount GAE obtained when the opening duration INCAM of the intake valve 31 is set to the second opening duration INCAM2 during execution of the all cylinder operation mode becomes substantially the same as the intake air amount GAK obtained at reactivation from the cylinder deactivation mode.

When the target lift VLp at reactivation from the cylinder deactivation mode is the second lift VL2, and the opening duration INCAM of the intake valve 31 is set to the second opening duration INCAM2, the opening duration INCAM of the intake valve 31 is changed to the third opening duration INCAM3 by changing the target lift VLp from the second lift VL2 to the third lift VL3. In this manner, by changing the opening duration INCAM of the intake valve 31 to the third opening duration INCAM3, the intake air amount GAK drawn into each operating cylinder is increased as compared to a case in which the opening duration INCAM of the intake valve 31 is set to the second opening duration INCAM2 at reactivation from the cylinder deactivation mode. The procedure of such an intake amount correction process will be described below with reference to FIG. 10.

Figure 10:
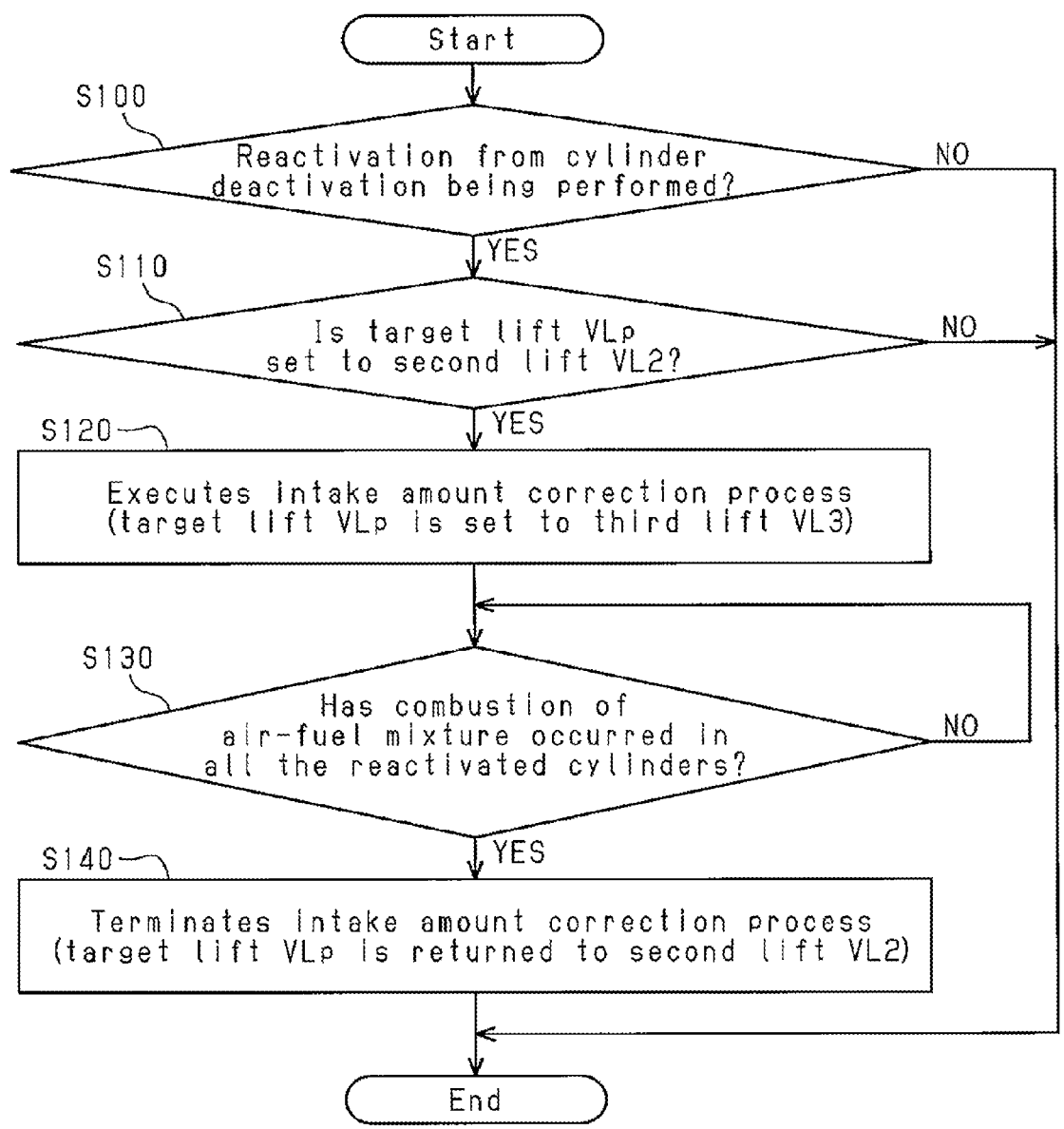
FIG. 10 is a flowchart showing a series of routine at reactivation from the cylinder deactivation mode in the present embodiment.

Series of steps shown in FIG. 10 are executed by the motor controller 150.

When the series of steps shown in FIG. 10 is started, the motor controller 150 determines whether reactivation from the cylinder deactivation mode to the all cylinder operation mode is being performed, that is, whether the second cylinder #2 and the third cylinder #3, which have been the deactivated cylinders, are starting to operate (S100). In the determining process in step S100, for example, the determination is positive if a switching requirement from the cylinder deactivation mode to the all cylinder operation mode is satisfied due to change in the engine load, or if a control signal for shifting the valve stop mechanism 28 from the activation mode to the deactivation mode is output from the engine controller 100.

If the decision outcome of step S100 is positive, the engine controller 100 changes the valve stop mechanism 28 to the deactivated state and starts fuel injection and ignition of the air-fuel mixture in the cylinders to be reactivated from the cylinder deactivation mode (that is, the second cylinder #2 and the third cylinder #3).

In step S100, if it is determined that reactivation from the cylinder deactivation mode is not being performed (S100: NO), that is, if the all cylinder operation mode is being performed or the cylinder deactivation mode is being continued, the motor controller 150 temporarily suspends the routine.

If reactivation from the cylinder deactivation mode is being performed (S100: YES), the motor controller 150 determines whether the current target lift VLp is set to the second lift VL2 (S110). If the target lift VLp is set to the first lift VL1, the opening duration of the intake valve 31 is set to the first opening duration INCAM1. Since the first opening duration INCAM1 is set to a period shorter than 180° C.A, overlap does not occur in the opening durations of the intake valves 31 between the cylinders as describe above. For this reason, the motor controller 150 determines whether the target lift VLp is set to the second lift VL2 in step S110. If the target lift VLp is set to a lift amount other than the second lift VL2 (S110: NO), that is, either the first lift VL1 or the third lift VL3, the motor controller 150 temporarily suspends the routine.

If the target lift VLp is set to the second lift VL2 (S110: YES), the motor controller 150 executes the intake amount correction process (S120). During execution of the intake amount correction process, the third lift VL3 is set as the target lift VLp, and the rotational phase of the cam 530 is controlled such that the actual maximum lift VL becomes equal to the third lift VL3.

Subsequently, the motor controller 150 determines whether the first combustion of air-fuel mixture has taken place after reactivation from the cylinder deactivation mode in all the cylinders reactivated from the cylinder deactivation mode, that is, in the second cylinder #2 and the third cylinder #3 (S130). In step S130, the determination will be positive if the engine controller 100 outputs a signal indicating that the combustion of air-fuel mixture has restarted in all the cylinders reactivated from the cylinder deactivation mode.

The engine controller 100 may determine combustion of air-fuel mixture as necessary.

For example, since output torque is generated as combustion of air-fuel mixture is started in the reactivated cylinders reactivated from the cylinder deactivation mode (that is, the second cylinder #2 and the third cylinder #3), the torque fluctuation in the reactivated cylinders is greater than that during the cylinder deactivation mode. The torque fluctuation in the second cylinder #2 and the third cylinder #3 may be calculated on the basis of, for example, the engine rotational speed. If the calculated value exceeds a predetermined threshold value, it may be determined that the combustion of air-fuel mixture has taken place. Furthermore, if combustion of air-fuel mixture is started in the reactivated cylinders that have been reactivated from the cylinder deactivation mode, engine vibration occurs during the combustion stroke. It is therefore possible to determine that the combustion of air-fuel mixture has occurred if such occurrence of the engine vibration is detected by, for example, a knocking sensor. Furthermore, since the combustion of air-fuel mixture is generally started in the reactivated cylinders after a while from reactivation from the cylinder deactivation mode, it is also possible to determine that combustion of air-fuel mixture has occurred in the reactivated cylinders if the elapsed time after reactivation from the cylinder deactivation mode has exceeded a predetermined threshold value.

If the decision outcome of step S130 is negative (S130: NO), that is, if air-fuel mixture has been burnt in neither the cylinders, which are the second cylinder #2 and the third cylinder #3, or if air-fuel mixture has not yet burnt in either the second cylinder #2 or the third cylinder #3, the motor controller 150 repeats the determination in step S130 until the engine controller 100 outputs a signal indicating that combustion of air-fuel mixture has occurred in all the cylinders that have been reactivated from the cylinder deactivation mode.

If it is determined in step S130 that combustion of air-fuel mixture has occurred in all the cylinders reactivated from the cylinder deactivation mode (S130: YES), the motor controller 150 terminates the above-described intake amount correction process (S140) and temporarily suspends the routine. In step S140, if the intake amount correction process is terminated, the target lift VLp is returned from the third lift VL3 to the second lift VL2.

Operation of the present embodiment will now be described with reference to FIG. 11.

Figure 11:
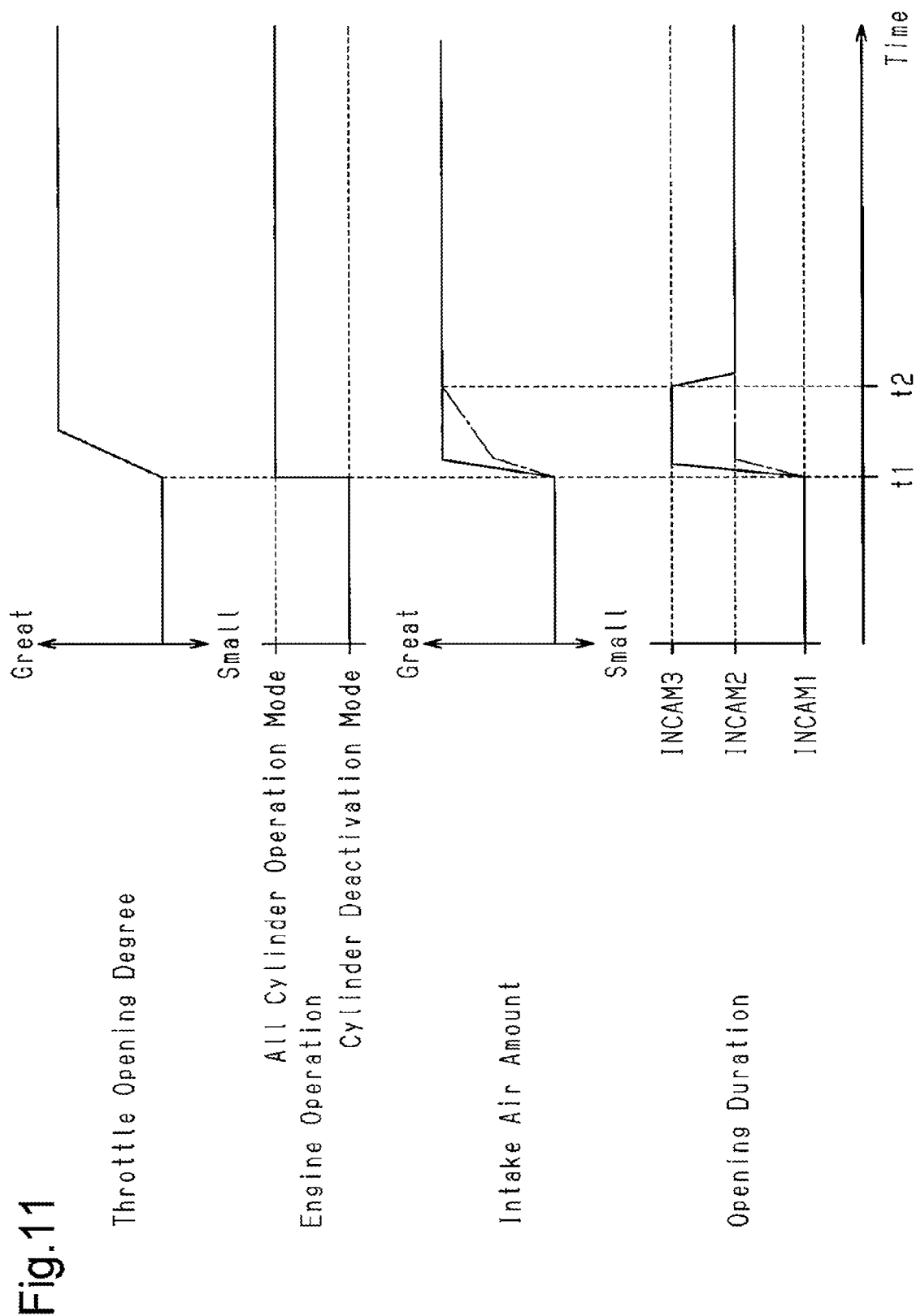
FIG. 11 is a timing chart showing a manner in which the opening duration is changed at reactivation from the cylinder deactivation mode in the present embodiment.

As shown in FIG. 11, if the opening degree of the throttle valve 33 is increased, and the engine load is increased, the engine operation is switched from the cylinder deactivation mode to the all cylinder operation mode (time T1). When the engine operation is switched to the all cylinder operation mode as described above, combustion is subsequently started in the cylinders reactivated from the cylinder deactivation mode (time t2).

If the target lift VLp corresponding to the engine output requirement at the reactivation from the cylinder deactivation mode is the second lift VL2, and the opening duration INCAM of the intake valve 31 is changed from the first opening duration INCAM1 to the second opening duration INCAM2 as shown by the long dashed short dashed line, overlap occurs in the opening durations of the intake valves 31 between the cylinders as described above. Thus, the intake air amount GAK drawn into each operating cylinder is temporarily reduced until combustion is started in the reactivated cylinders. As a result, as shown by the long dashed short dashed line in FIG. 11, increase in intake air amount delays in the engine 1 immediately after switching from the cylinder deactivation mode to the all cylinder operation mode, and the boost pressure falls below the required pressure.

If the above-mentioned intake amount correction process is performed, even if the target lift VLp corresponding to the engine output requirement at reactivation from the cylinder deactivation mode is the second lift VL2, the opening duration INCAM of the intake valve 31 is changed from the first opening duration INCAM1 to the above-mentioned third opening duration INCAM3. That is, the opening duration INCAM is changed to the third opening duration INCAM3, which is set longer than the first opening duration INCAM1 and the second opening duration INCAM2, which are set during execution of the cylinder deactivation mode. Thus, as described above, the intake air amount GAK obtained during reactivation from the cylinder deactivation mode is increased to approach the intake air amount GAK when combustion is started in the cylinders reactivated from the cylinder deactivation mode. As a result, as shown by the solid line in FIG. 11, the intake air amount of the engine 1 during reactivation from the cylinder deactivation mode is increased at an early stage toward the intake air amount that is obtained when combustion is started in all the cylinders reactivated from cylinder deactivation mode. This prevents reduction in the boost pressure relative to the required pressure as described above.

When combustion is started in all the cylinders reactivated from the cylinder deactivation mode (time t2), the discharge pressure of the operating cylinders and the reactivated cylinders is sufficiently increased, which in turn sufficiently increases the boost pressure. At time t2, the intake amount correction process is terminated, and the target lift VLp is returned from the third lift VL3 to the second lift VL2.

As described above, if overlap occurs in the opening durations of the intake valves 31 between the cylinders by controlling the valve actuation of the intake valve 31 on the basis of the engine output requirement, the intake amount correction process is executed at reactivation from the cylinder deactivation mode to change the valve actuation such that the intake air amount GAK is increased as compared to a case in which the valve actuation of the intake valve 31 is controlled on the basis of the engine output requirement. That is, at reactivation from the cylinder deactivation mode, the intake amount correction process is executed, which controls the valve actuation to temporarily increase the opening duration of the intake valve 31 to increase the intake air amount GAK. As described above, temporarily increasing the opening duration of the intake valves 31 of the operating cylinders during reactivation from the cylinder deactivation mode compensates for the amount of intake air of the operating cylinders that is reduced by the flow of intake air into the reactivated cylinders. This configuration effectively restrains, at reactivation from the cylinder deactivation mode, reduction in intake air in the first cylinder #1 and the fourth cylinder #4, the intake valves 31 of which have been opened and closed even during execution of the cylinder deactivation mode, and thus restrains reduction in the output torque of the first cylinder #1 and the fourth cylinder #4. The configuration further restrains, at reactivation from the cylinder deactivation mode, torque fluctuation that may occur due to overlap that occurs in the opening durations of the intake valves 31 between the cylinders in a reliable manner.

When combustion of air-fuel mixture is started in the third cylinder #3 and the second cylinder #2, which have been reactivated from the cylinder deactivation mode, output torque is generated also from the reactivated cylinders. The motor controller 150 performs the determining process of the above-described step S130 to terminate the execution of the intake amount correction process after the first combustion of air-fuel mixture is started after the reactivation from the cylinder deactivation mode in the third cylinder #3 and the second cylinder #2, which are reactivated from the cylinder deactivation mode. Since execution of the intake amount correction process is terminated after generation of output torque is started also from the reactivated third cylinder #3 and second cylinder #2, reoccurrence of torque fluctuation caused by termination of execution of the intake amount correction process is restrained.

Furthermore, the above-described variable valve actuation mechanism 600 is configured as a multi-step variable valve actuation mechanism, which varies the valve actuation in multiple steps. In such a multi-step variable valve actuation mechanism, unlike the continuous variable valve actuation mechanism, which is capable of continuously changing the valve actuation, the valve actuation cannot be finely adjusted. For this reason, the above-described overlap tends to occur in the opening durations of the intake valves 31 between the cylinders at reactivation from the cylinder deactivation mode. To cope with such a situation, the variable valve actuation mechanism 600 sets a valve actuation during execution of the intake amount correction process as one of predetermined three valve actuations. That is, the above-described third opening duration INCAM3, which can increase the intake air amount GAK even in a state in which overlap occurs in the opening durations of the intake valves 31 between the cylinders, is set as one of predetermined three valve actuations. This configuration allows the multi-step variable valve actuation mechanism 600, which cannot finely adjust the valve actuation, to restrain torque fluctuation immediately after reactivation from the cylinder deactivation mode by executing the above-described intake amount correction process.

The engine 1, which includes the turbocharger 70, ensures boost pressure during execution of the cylinder deactivation mode by exhaust gas pressure of the operating cylinders (the first cylinder #1 and the fourth cylinder #4), the intake valves 31 of which have been opened and closed even during execution of the cylinder deactivation mode. If intake air also starts to flow into the reactivated cylinders due to reactivation from the cylinder deactivation mode, the intake air amount that flows into the operating cylinders is reduced by an amount corresponding to the intake air amount that flows into the reactivated cylinders. The reduction in intake air amount reduces the exhaust as pressure of the operating cylinders, resulting in decrease in the boost pressure. Thus, in the engine 1, which includes the turbocharger 70, the reduction amount of the output torque when intake air to the operating cylinders is reduced is greater than a case with an engine that does not include the turbocharger 70, and the above-described torque fluctuation becomes significant. In this respect, the present embodiment performs the above-described intake amount correction process to restrain reduction in intake air in the operating cylinders immediately after reactivation from the cylinder deactivation mode. This restrains the occurrence of torque fluctuation caused by reduction in the boost pressure immediately after reactivation from the cylinder deactivation mode.

Furthermore, in the engine 1, the external EGR is recirculated into the cylinders. If some of the intake air that has been flowing into the operating cylinders (the first cylinder #1 and the fourth cylinder #4) flows into the reactivated cylinders (the third cylinder #3 and the second cylinder #2) that have been reactivated from the cylinder deactivation mode at reactivation from the cylinder deactivation mode, some of the external EGR that has been flowing into the operating cylinders also starts to flow into the reactivated cylinders. Thus, the external EGR amount that flows into the operating cylinders is changed, causing the combustion state of the operating cylinders to be changed. The change in the combustion state may result in torque fluctuation. In this respect, since the present embodiment performs the above-described intake amount correction process to restrain reduction in intake air in the operating cylinders immediately after reactivation from the cylinder deactivation mode, change in the external EGR amount that flows into the operating cylinders is also restrained. Thus, the occurrence of torque fluctuation caused by change in the external EGR amount that flows into the operating cylinders is also restrained at reactivation from the cylinder deactivation mode.

As described above, the present embodiment has the following advantages.

(1) At reactivation from the cylinder deactivation mode, the intake amount correction process is executed, in which the valve actuation is controlled to temporarily increase the opening duration INCAM of the intake valve 31. More specifically, if overlap occurs in the opening durations of the intake valves 31 between the cylinders at reactivation from the cylinder deactivation mode by controlling the valve actuation of the intake valve 31 on the basis of the engine output requirement during reactivation from the cylinder deactivation mode, the intake amount correction process is executed, which controls the valve actuation such that the intake air amount GAK is increased as compared to a case in which the valve actuation is controlled on the basis of the engine output requirement during the cylinder deactivation mode. Thus, at reactivation from the cylinder deactivation mode, torque fluctuation that may occur due to overlap in the opening durations of the intake valves 31 between the cylinders is restrained in a reliable manner.

(2) In the cylinders reactivated from the cylinder deactivation mode, execution of the intake amount correction process is terminated after the first combustion of air-fuel mixture is started. Thus, reoccurrence of torque fluctuation caused by terminating execution of the intake amount correction process is restrained.

(3) In the multi-step variable valve actuation mechanism 600, the above-described valve actuation during execution of the intake amount correction process is set as one of the predetermined valve actuations. Thus, even with the multi-step variable valve actuation mechanism 600, which cannot finely adjust the valve actuation, the torque fluctuation is restrained immediately after reactivation from the cylinder deactivation mode by executing the above-described intake amount correction process.

(4) The above-described intake amount correction process is executed in the engine 1, which includes the turbocharger 70. This configuration restrains the occurrence of torque fluctuation caused by reduction in the boost pressure immediately after reactivation from the cylinder deactivation mode.

(5) The above-described intake amount correction process is executed in the engine 1, which includes the EGR passage 450 for recirculating some of the exhaust gas to the intake air. This configuration restrains the occurrence of torque fluctuation caused by change in the external EGR amount that flows into the cylinders immediately after reactivation from the cylinder deactivation mode.

The above embodiment may be modified as follows.

In the above-described step S130, it is determined whether combustion of air-fuel mixture has occurred in all the cylinders reactivated from the cylinder deactivation mode. Alternatively, it may be determined whether combustion of air-fuel mixture has occurred in some of the cylinders reactivated from the cylinder deactivation mode. That is, in the above-described embodiment, it may be determined whether combustion of air-fuel mixture has occurred in either the second cylinder #2 or the third cylinder #3, which has been reactivated from the cylinder deactivation mode. This modification also restrains reoccurrence of torque fluctuation caused by terminating execution of the intake amount correction process to a certain degree.

At reactivation from the cylinder deactivation mode, the valve actuation of the intake valve 31 is controlled such that the intake air amount GAK is increased in all the cylinders. Alternatively, at reactivation from the cylinder deactivation mode, the valve actuation of the intake valve 31 may be controlled such that the intake air amount GAK is increased in some of the cylinders. For example, in the above-described embodiment, at reactivation from the cylinder deactivation mode, the valve actuation of the intake valve 31 may be controlled such that only the intake air amount GAK of the first cylinder #1 or only the intake air amount GAK of the third cylinder #3 is increased.

In the above-described embodiment, as shown in FIG. 9, the length of the above-described third opening duration INCAM3 is set such that the intake air amount GAK obtained at reactivation from the cylinder deactivation mode is substantially the same as the intake air amount GAE obtained when the opening duration INCAM of the intake valve 31 is set to the second opening duration INCAM2 during execution of the all cylinder operation mode. With this configuration, during execution of the intake amount correction process, the valve actuation of the intake valve 31 is controlled such that the intake air amount GAK obtained during reactivation from the cylinder deactivation mode approaches the intake air amount GAK obtained when combustion is started in the cylinders reactivated from the cylinder deactivation mode. However, the third opening duration INCAM3 may be changed as required. That is, if overlap occurs in the opening durations of the intake valves 31 between the cylinders by controlling the valve actuation of the intake valve 31 on the basis of the engine output requirement at reactivation from the cylinder deactivation mode, the valve actuation of the intake valve 31 may be controlled such that the intake air amount GAK is increased as compared to a case in which the valve actuation is controlled on the basis of the engine output requirement.

The above-described variable valve actuation mechanism 600 is a multi-step variable valve actuation mechanism, which changes the valve actuation in multiple steps, but may be a continuous variable valve actuation mechanism, which continuously changes the valve actuation. For example, the valve actuation can be continuously changed by changing the conversion mechanism 500 of the above-described variable valve actuation mechanism 600.

Figure 12:
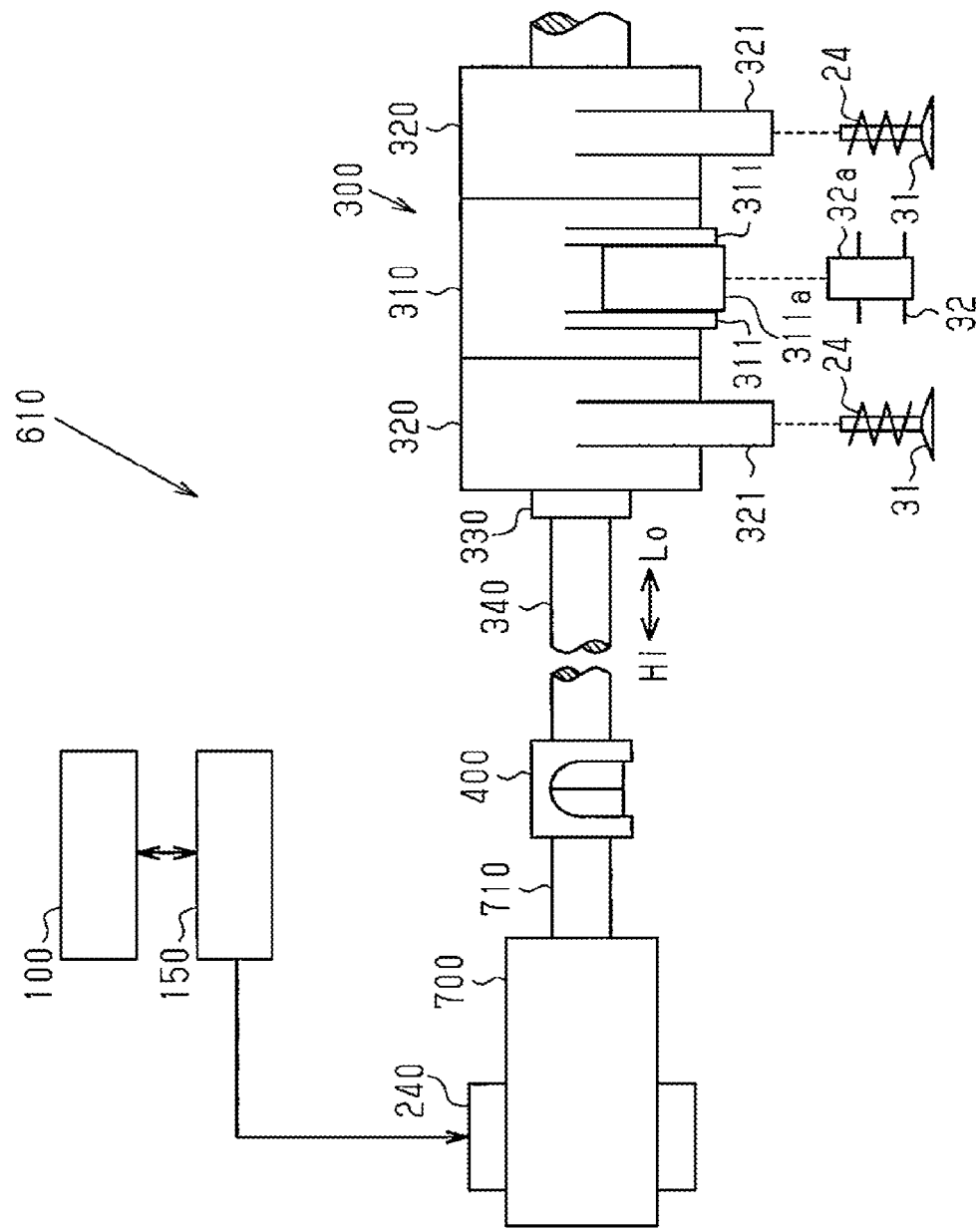
FIG. 12 is a schematic diagram of a continuous variable valve actuation mechanism according to a modification of the present embodiment.

FIG. 12 shows an example of a continuous variable valve actuation mechanism. As shown in FIG. 12, the drive portion of a variable valve actuation mechanism 610, which continuously changes the valve actuation, includes a motor 240 and a conversion mechanism 700, which converts rotation of the motor 240 to linear motion of an output shaft 710 and outputs the linear motion. The distal end portion of the control shaft 340 and the distal end portion of the output shaft 710 are coupled with a coupling member 400. When the motor 240 is rotated within a predetermined range, the rotation of the motor 240 is converted to a linear motion by the conversion mechanism 700, and the linear motion is transmitted to the control shaft 340 via the output shaft 710. When the control shaft 340 moves in the axial direction, the variable actuation mechanism 300 is activated. The motor 240 is connected to the motor controller 150. Controlling the rotational angle in accordance with activation signals from the motor controller 150 changes the valve actuation (maximum lift VLA and opening duration INCAMA) of the intake valve 31 provided in each of the cylinders.

Figure 13:
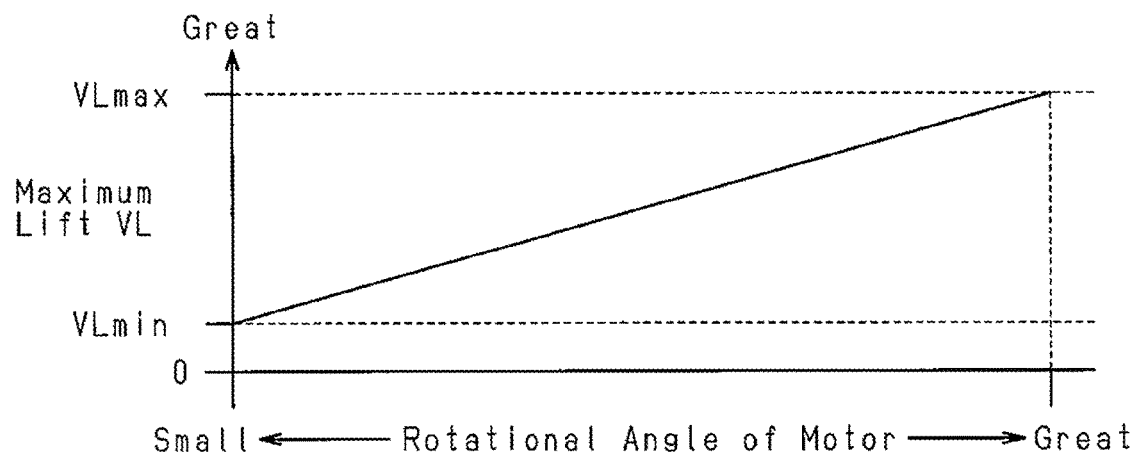
FIG. 13 is a graph showing a manner in which the maximum lift is changed in the continuous variable valve actuation mechanism.

As shown in FIG. 13, when the variable valve actuation mechanism 610 is operated, the maximum lift VL of the intake valve 31 is continuously changed between the minimum value VLmin and the maximum value VLmax in accordance with the rotational angle of the motor 240.

Even in a case with such a continuous variable valve actuation mechanism 610, when the intake amount correction process is executed in step S120 shown in FIG. 10, the target lift VLp is set to the third lift VL3 such that the opening duration INCAM of the intake valve 31 seeks the above-described third opening duration INCAM3. Thus, the advantages other than the above-described advantage (3) are obtained.

When the valve actuation is changed by the above-described variable actuation mechanism 300, the maximum lift VL and the opening duration INCAM of the intake valve 31 are changed in synchronization. The target value of the maximum lift VL is set in the above-described embodiment, but the valve actuation of the intake valve 31 may be controlled by setting the target value of the opening duration INCAM.

The maximum lift of the intake valve 31 is changed in three steps by the variable valve actuation mechanism 600. Alternatively, the above-described first lift VL1 may be omitted, and a multi-step variable valve actuation mechanism that changes the maximum lift of the intake valve 31 in two steps may be employed. Furthermore, a multi-step variable valve actuation mechanism that changes the maximum lift of the intake valve 31 in four or more steps may be employed.

In the series of steps shown in FIG. 10, the process of step S110 may be omitted. If determination in step S100 is positive, the processes of step S120 and the following steps may be sequentially performed. In this modification also, since the opening duration INCAM of the intake valve 31 in the cylinders is set to the above-described third opening duration INCAM3 immediately after reactivation from the cylinder deactivation mode, the operational advantages according to the above-described embodiment are provided.

The shape of the above-described cam 530 is merely an example, and the cam 530 may have any other shape if the control shaft 340 can be moved in the axial direction.

The series of steps shown in FIG. 10 may be performed by the engine controller 100 instead of the motor controller 150.

The turbocharger 70 or the intercooler 35 may be omitted from the engine 1. In this case also, the advantages other than the above-described advantage (4) are provided.

The exhaust gas recirculation apparatus (such as the EGR passage 450, the EGR valve 460, and the EGR cooler 470) may be omitted from the engine 1. In this case also, the advantages other than the above-described advantage (5) are provided.

The turbocharger 70, the intercooler 35, the exhaust gas recirculation apparatus (such as the EGR passage 450, the EGR valve 460, and the EGR cooler 470) may be omitted from the engine 1. In this case also, the advantages other than the above-described advantages (4) and (5) are provided.

The above-described valve stop mechanism 28 is included as the valve stop mechanism for stopping the opening and closing operation of the intake valve 31 and the exhaust valve 41. However, the valve stop mechanism may be changed to other mechanism as required. For example, pivoting and pivoting restraint of the rocker arm may be switched with other mechanism. Furthermore, for example, the variable actuation mechanism 300 is configured such that the minimum value of the maximum lift VL of the intake valves 31 in the cylinders that are deactivated in the cylinder deactivation mode is zero. The opening and closing of the intake valves 31 of the cylinders are stopped by setting the maximum lift VL of the intake valves 31 of the cylinders that are deactivated during the cylinder deactivation mode to zero during execution of the cylinder deactivation mode.

The above-described variable actuation mechanism 300 is a mechanism that is capable of changing the maximum lift VL and the opening duration INCAM of the intake valve 31. Alternatively, the variable actuation mechanism 300 may be a mechanism that is capable of changing only the opening duration INCAM. Furthermore, the above-described variable actuation mechanism 300 is a mechanism that changes the opening duration INCAM by changing both the valve opening timing IVO and the valve closing timing IVC of the intake valve 31. Alternatively, a mechanism that changes opening duration INCAM by changing only the valve opening timing IVO of the intake valve 31 or a mechanism that changes the opening duration INCAM by changing only the valve closing timing IVC of the intake valve 31 may be employed.

The structure of the variable valve actuation mechanism 600 is merely an example, and a variable valve actuation mechanism may be employed that changes the valve actuation in multiple steps with other structure. For example, if a directly driven valve train is employed, the valve actuation is changed in multiple steps by providing a variable valve actuation mechanism that changes the operation amount of the valve lifter, which is operated by a cam, in multiple steps. Furthermore, if a rocker arm valve train is employed, the valve actuation is changed in multiple steps by providing a variable valve actuation mechanism that changes the pivoting amount of the rocker arm by changing the depression amount of the lash adjuster that supports the rocker arm in multiple steps. Furthermore, in a case with the rocker arm valve train, the valve actuation is changed in multiple steps by providing a variable valve actuation mechanism that varies the shape of the rocker arm in multiple steps to change the pivoting amount of the rocker arm.

Figure 14:
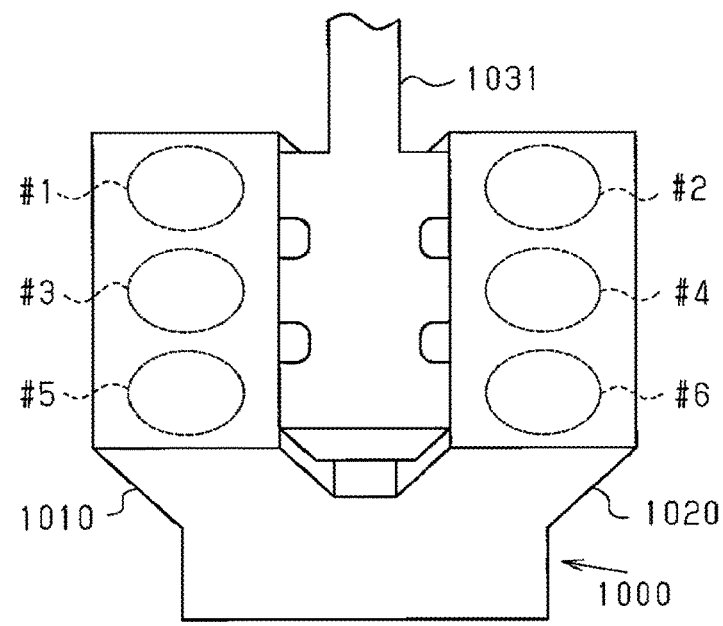
FIG. 14 is a schematic diagram of a V6 engine according to a modification of the present embodiment.
Figure 15:
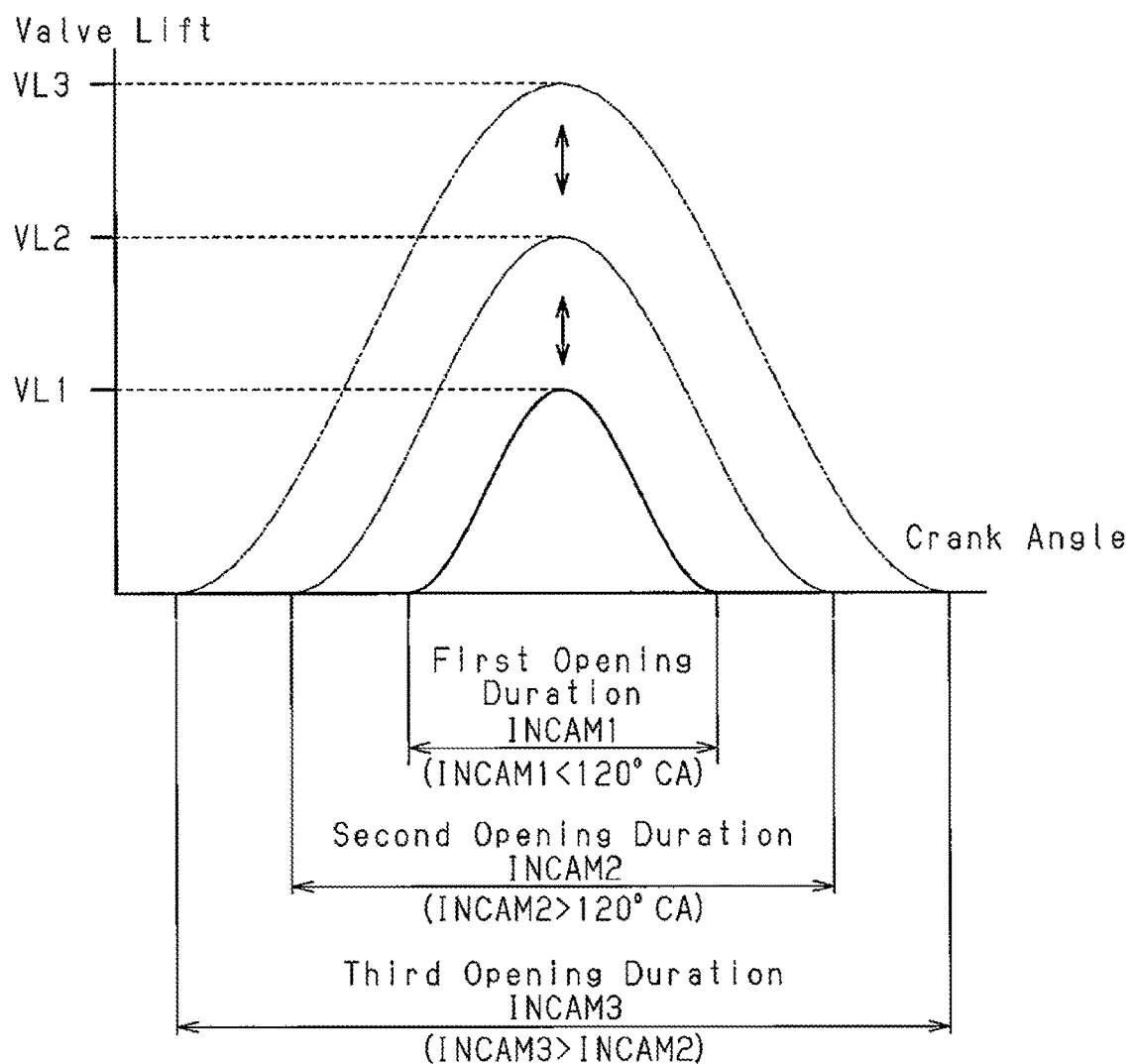
FIG. 15 is a graph showing the state in which the opening duration is changed in the V6 engine.

The engine 1 is an inline four-cylinder engine. However, the operational advantages according to the above-described embodiment are provided by executing the above-described overlap controlling process in an engine with a different number of cylinders or in an engine with a different cylinder arrangement pattern (for example, a V engine, a W engine, a horizontally opposed engine, and a radial engine). FIGS. 14 and 15 show a setting example of the opening duration INCAM when executing the overlap controlling process in a V6 engine.

As shown in FIG. 14, an engine 1000 is a V6 engine, and a first bank 1010 includes a first cylinder #1, a third cylinder #3, and a fifth cylinder #5. A second bank 1020 includes a second cylinder #2, a fourth cylinder #4, and a sixth cylinder #6. An intake manifold 1031, which distributes intake air to the cylinders, is located between the first bank 1010 and the second bank 1020. The engine 1000 ignites air-fuel mixture in the order of the first cylinder #1, the second cylinder #2, the third cylinder #3, the fourth cylinder #4, the fifth cylinder #5, and the sixth cylinder #6. Furthermore, when the cylinder deactivation mode is executed, the operation of all the cylinders provided in the second bank 1020 (the second cylinder #2, the fourth cylinder #4, and the sixth cylinder #6) is deactivated in the same manner as the above-described engine 1.

As shown in FIG. 15, the maximum lift VL of the intake valves provided in the cylinders is changed in multiple steps in the same manner as in the above-described embodiment. The first opening duration INCAM1, which is the opening duration INCAM when the maximum lift VL of the variable intake valve is set to the minimum value, that is, the first lift VL1, is set to an opening duration shorter than 120° C.A. Furthermore, the second opening duration INCAM2, which is the opening duration INCAM when the maximum lift VL is set to the second lift VL2, is set to an opening duration longer than 120° C.A. The third opening duration INCAM3, which is the opening duration INCAM when the maximum lift VL is set to the third lift VL3, is set to an opening duration even longer than the second opening duration INCAM2. For example, like the above-described embodiment, the length of the third opening duration INCAM3 may be set such that the intake air amount GAK obtained at reactivation from the cylinder deactivation mode is substantially the same as the intake air amount GAE obtained when the opening duration INCAM of the intake valve 31 is set to the second opening duration INCAM2 during execution of the all cylinder operation mode.

Figure 16:
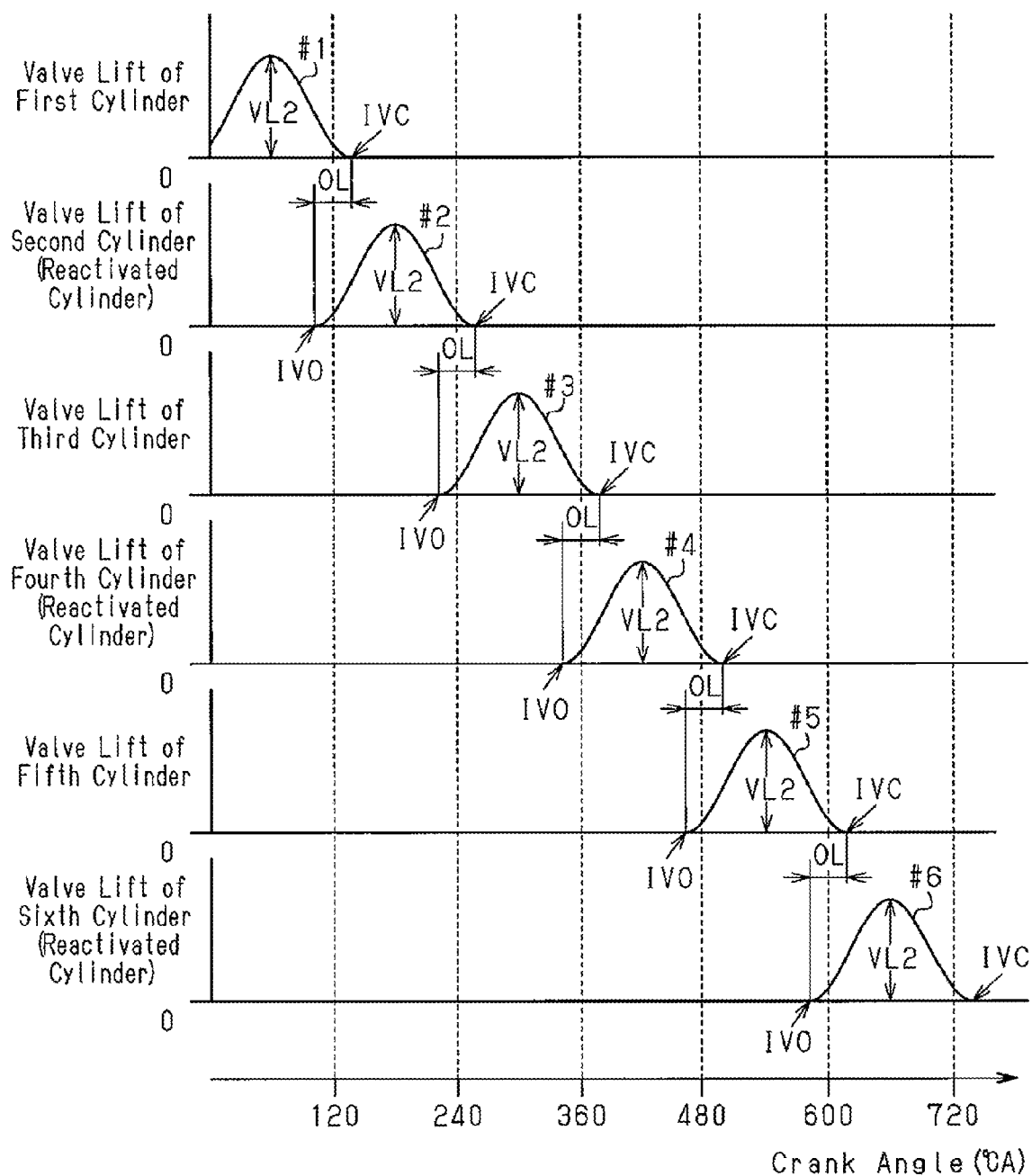
FIG. 16 is a diagram showing an overlap state of the opening duration between the cylinders at reactivation from the cylinder deactivation mode in the V6 engine.

As shown in FIG. 16, when the engine 1000 is reactivated from the cylinder deactivation mode, the intake valves of the deactivated cylinders that have been kept closed before reactivation (the second cylinder #2, the fourth cylinder #4, the sixth cylinder #6) start the opening and closing operation. As shown in FIG. 15, the second opening duration INCAM2, which is the opening duration INCAM of the intake valve when the maximum lift VL is set to the second lift VL2, is set to an opening duration longer than 120° C.A. In the V6 engine, the starting of the intake stroke in each of the cylinders is displaced by 120° C.A in the order of ignition. Thus, as shown in FIG. 16, if the opening duration INCAM of the intake valve set on the basis of the engine output requirement at reactivation from the cylinder deactivation mode is the second opening duration INCAM2, the opening duration INCAM of the intake valve overlaps between the operating cylinders, which have been operated during the cylinder deactivation mode, and the reactivated cylinders, which have been reactivated from the cylinder deactivation mode. For example, the opening duration INCAM of the intake valve of the first cylinder #1, which is one of the operating cylinders, overlaps with the opening duration INCAM of the intake valve of the second cylinder #2, which is one of the reactivated cylinders and performs an intake stroke after the first cylinder #1. Similarly, the opening duration INCAM of the intake valve of the third cylinder #3, which is one of the operating cylinders, overlaps with the opening duration INCAM of the intake valve of the fourth cylinder #4, which is one of the reactivated cylinders and performs an intake stroke after the third cylinder #3. Similarly, the opening duration INCAM of the intake valve of the fifth cylinder #5, which is one of the operating cylinders, overlaps with the opening duration INCAM of the intake valve of the sixth cylinder #6, which is one of the reactivated cylinders and performs an intake stroke after the fifth cylinders #5.

As described above, if overlap occurs in the opening duration INCAM of the intake valve between the cylinders at reactivation from the cylinder deactivation mode, the opening duration INCAM of the intake valve is changed from the second opening duration INCAM2 to the third opening duration INCAM3 by performing the series of steps shown in FIG. 10. Thus, at reactivation from the cylinder deactivation mode, reduction in intake air is efficiently restrained in the cylinders including the first cylinder #1, the third cylinder #3, and the fifth cylinder #5, the intake valves of which have been opened and closed even during execution of the cylinder deactivation mode, thus restraining decrease in the output torque of the first cylinder #1, the third cylinder #3, and the fifth cylinder #5. Thus, even with such a V6 engine, torque fluctuation that may occur due to overlap in the opening duration INCAM of the intake valves between the cylinders is restrained in a reliable manner at reactivation from the cylinder deactivation mode.

DESCRIPTION OF THE REFERENCE NUMERALS

1 . . . Engine, 10 . . . Cylinder Block, 11 . . . Cylinder Bore, 12 . . . Piston, 13 . . . Combustion Chamber, 20 . . . Cylinder Head, 21 . . . Intake Port, 22 . . . Exhaust Port, 24 . . . Valve Spring, 25 . . . Lash Adjuster, 26 . . . Rocker Arm, 26a . . . Roller, 30 . . . Intake Passage, 31 . . . Intake Valve, 32 . . . Intake Camshaft, 32a . . . Intake Cam, 33 . . . Throttle Valve, 34 . . . Intake Passage, 35 . . . Intercooler, 41 . . . Exhaust Valve, 42 . . . Exhaust Camshaft, 42a . . . Exhaust Cam, 45 . . . Exhaust Manifold, 46 . . . Exhaust Passage, 50 . . . Spring, 70 . . . Turbocharger, 71 . . . Compressor Housing, 72 . . . Turbine Housing, 100 . . . Engine Controller, 150 . . . Motor Controller, 210 . . . Motor, 211 . . . Rotational Angle Sensor, 220 . . . Speed Reducing Mechanism, 240 . . . Motor, 300 . . . Variable Actuation Mechanism, 310 . . . Input Portion, 311 . . . Input Arm, 311a . . . Roller, 312 . . . Helical Spline, 313 . . . Protrusion, 314 . . . Housing, 320 . . . Output Portion, 321 . . . Output Arm, 322 . . . Helical Spline, 323 . . . Housing, 330 . . . Support Pipe, 340 . . . Control Shaft, 350 . . . Slider Gear, 351 . . . Helical Spline, 352 . . . Helical Spline, 400 . . . Coupling Member, 450 . . . EGR Passage, 460 . . . EGR Valve, 470 . . . EGR Cooler, 500 . . . Conversion Mechanism, 510 . . . Holder, 511 . . . Coupling Shaft, 520 . . . Guide, 530 . . . Cam, 530B . . . Reference Circle, 540 . . . Roller, 600, 610 . . . Variable Valve Actuation Mechanism, 700 . . . Conversion Mechanism, 710 . . . Output Shaft, 1000 . . . Engine, 1010 . . . First Bank, 1020 . . . Second Bank, 1031 . . . Intake Manifold.

The invention claimed is:

1. A controller for a variable valve actuation mechanism applied to an internal combustion engine, wherein the engine includes a plurality of cylinders, a plurality of intake valves each provided in one of the cylinders, and a variable valve actuation mechanism, which changes valve actuation of the intake valves, and the engine is operable in a cylinder deactivation mode, which keeps the intake valves of some of the cylinders closed, the controller comprising:
a control section that is configured to control the valve actuation in accordance with an engine output requirement, wherein
even during execution of the cylinder deactivation mode, the intake valve of an operating one of the cylinders is opened and closed,
the control section is configured to execute an intake amount correction process, which controls the valve actuation of the operating cylinder such that, when the internal combustion engine is reactivated from the cylinder deactivation mode, opening duration of the intake valve of the operating cylinder is temporarily increased as compared to the opening duration in a case in which the valve actuation of the operating cylinder is controlled in accordance with the engine output requirement during the cylinder deactivation mode, and
when overlap occurs in opening duration of the intake valves between the cylinders by controlling the valve actuation in accordance with the engine output requirement at reactivation from the cylinder deactivation mode, the control section is configured to execute the intake amount correction process such that the intake air amount of the operating cylinder is increased as compared to a case in which the valve actuation is controlled in accordance with the engine output requirement during the cylinder deactivation mode.

2. The controller for a variable valve actuation mechanism according to claim 1, wherein, during execution of the intake amount correction process, the control section is configured to control the valve actuation such that the intake air amount of the operating cylinder obtained during reactivation from the cylinder deactivation mode approaches the intake air amount of the operating cylinder when combustion of air-fuel mixture is started in the cylinder reactivated from the cylinder deactivation mode.

3. The controller for a variable valve actuation mechanism according to any one of claim 1, wherein the control section is configured to terminate execution of the intake amount correction process after a first combustion of air-fuel mixture after the reactivation from the cylinder deactivation mode in the cylinder reactivated from the cylinder deactivation mode.

4. The controller for a variable valve actuation mechanism according to claim 1, wherein the variable valve actuation mechanism is a multi-step variable valve actuation mechanism, which changes the valve actuation in multiple steps by selecting a valve actuation among a plurality of predetermined valve actuations, and the valve actuation during execution of the intake amount correction process is set as one of the valve actuations.

5. The controller for a variable valve actuation mechanism according to claim 1, wherein the internal combustion engine includes a forced induction device, which increases pressure of intake air using exhaust gas.

6. The controller for a variable valve actuation mechanism according to claim 1, wherein the internal combustion engine includes a recirculation passage, which recirculates some of exhaust gas to intake air.

* * * * *